United States Patent
Nakatsuka

(10) Patent No.: US 12,507,415 B2
(45) Date of Patent: Dec. 23, 2025

(54) SEMICONDUCTOR MEMORY DEVICE

(71) Applicant: Kioxia Corporation, Tokyo (JP)

(72) Inventor: Keisuke Nakatsuka, Kobe Hyogo (JP)

(73) Assignee: Kioxia Corporation, Tokyo (JP)

( * ) Notice: Subject to any disclaimer, the term of this patent is extended or adjusted under 35 U.S.C. 154(b) by 641 days.

(21) Appl. No.: 17/941,605

(22) Filed: Sep. 9, 2022

(65) Prior Publication Data

US 2023/0005938 A1 Jan. 5, 2023

Related U.S. Application Data

(63) Continuation of application No. PCT/JP2020/010813, filed on Mar. 12, 2020.

(51) Int. Cl.
*H10B 43/35* (2023.01)
*G11C 5/06* (2006.01)
*H10B 43/20* (2023.01)

(52) U.S. Cl.
CPC ............. *H10B 43/35* (2023.02); *G11C 5/063* (2013.01); *H10B 43/20* (2023.02)

(58) Field of Classification Search
CPC ........ H10B 43/35; H10B 43/20; H10B 43/27; H10B 43/10; G11C 5/063; G11C 16/0483
See application file for complete search history.

(56) References Cited

U.S. PATENT DOCUMENTS

| | | | |
|---|---|---|---|
| 8,278,170 B2 * | 10/2012 | Lee .................. | H10B 41/20 438/266 |
| 10,276,586 B2 | 4/2019 | Murakoshi et al. | |
| 10,319,740 B2 | 6/2019 | Yoshimizu | |
| 10,763,276 B2 * | 9/2020 | Takekida ............ | H10B 43/27 |
| 11,605,644 B2 * | 3/2023 | Xiao .................. | G11C 16/0466 |
| 2011/0065270 A1 * | 3/2011 | Shim ................... | H10D 30/693 257/E21.613 |
| 2018/0358376 A1 | 12/2018 | Ku et al. | |
| 2019/0198522 A1 * | 6/2019 | Takekida ............ | H10B 43/35 |
| 2020/0098784 A1 * | 3/2020 | Nagashima ........ | H01L 21/31116 |
| 2020/0119038 A1 * | 4/2020 | Hopkins ............. | H10B 43/35 |
| 2020/0303399 A1 * | 9/2020 | Xiao .................. | H01L 21/31111 |

FOREIGN PATENT DOCUMENTS

| | | |
|---|---|---|
| JP | 2012-015517 A | 1/2012 |
| JP | 2017-163044 A | 9/2017 |
| JP | 2018-164070 A | 10/2018 |
| JP | 2019-004147 A | 1/2019 |
| JP | 2019-046918 A | 3/2019 |

* cited by examiner

*Primary Examiner* — Steven B Gauthier
*Assistant Examiner* — Khatib A Rahman
(74) *Attorney, Agent, or Firm* — Foley & Lardner LLP

(57) ABSTRACT

A semiconductor memory device according to an embodiment includes first to ninth conductive layers, first and second insulating members, and first to fourth pillars. A distance between the first and second pillars in a cross section including the second conductive layer and the sixth conductive layer is smaller than a distance between the first and second pillars in a cross section including the third conductive layer and the seventh conductive layer. A distance between the third and fourth pillars in a cross section including the fourth conductive layer and the eighth conductive layer is greater than a distance between the third and fourth pillars in a cross section including the fifth conductive layer and the ninth conductive layer.

9 Claims, 17 Drawing Sheets

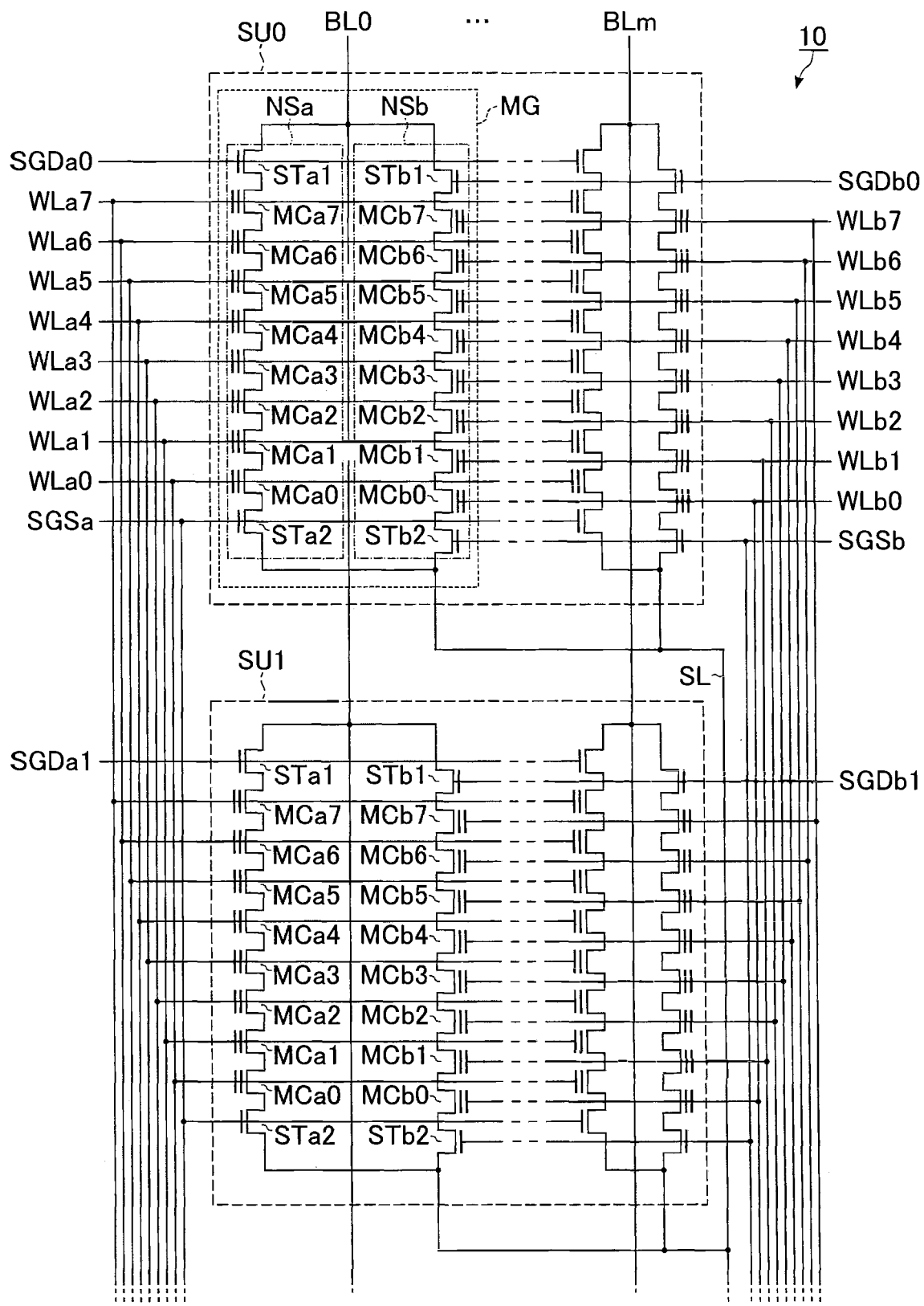
F I G. 2

SEMICONDUCTOR MEMORY DEVICE

CROSS-REFERENCE TO RELATED APPLICATIONS

This application is a Continuation Application of PCT Application No. PCT/JP2020/010813, filed Mar. 12, 2020, the entire contents of which are incorporated herein by reference.

FIELD

An embodiment relates to a semiconductor memory device.

BACKGROUND

A NAND-type flash memory capable of storing data in a non-volatile manner is known.

BRIEF DESCRIPTION OF THE DRAWINGS

FIG. 2 is a circuit diagram illustrating an example of a circuit configuration of a memory cell array included in the semiconductor memory device according to the embodiment.

DETAILED DESCRIPTION

Figure 1:
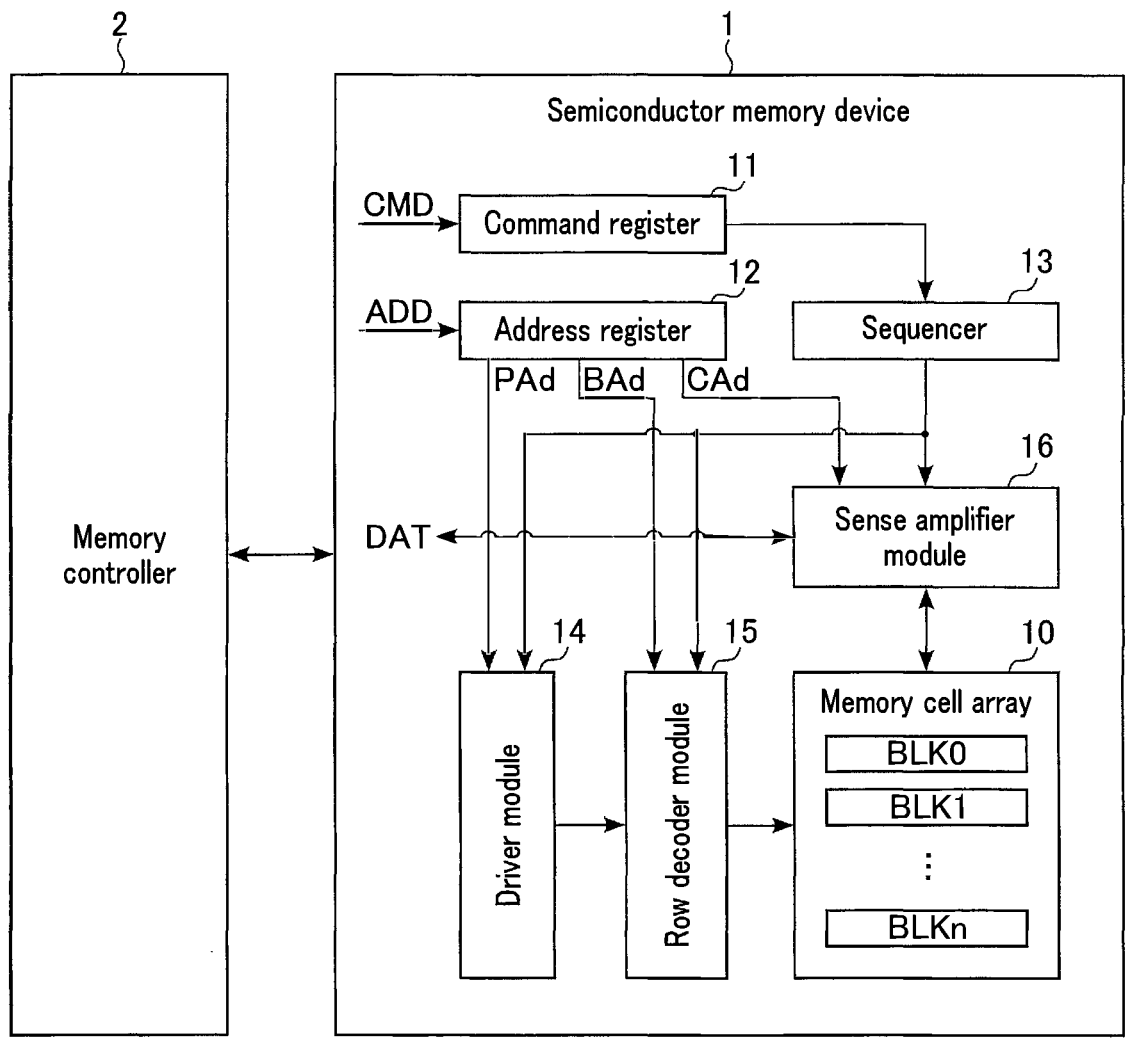
FIG. 1 is a block diagram illustrating a configuration example of a semiconductor memory device according to an embodiment.

In general, according to one embodiment, a semiconductor memory device includes first to ninth conductive layers, first and second insulating members, and first to fourth pillars. The second conductive layer, a third conductive layer, a fourth conductive layer, and a fifth conductive layer are stacked above the first conductive layer to be separated from each other in a first direction. The sixth conductive layer, a seventh conductive layer, an eighth conductive layer, and a ninth conductive layer are stacked above the first conductive layer, and are respectively provided in same layers as the second conductive layer, the third conductive layer, the fourth conductive layer, and the fifth conductive layer, to be separated from the second conductive layer, the third conductive layer, the fourth conductive layer, and the fifth conductive layer in a second direction intersecting the first direction. The first insulating member is provided along the first direction, and comprises a portion provided between the second conductive layer and the sixth conductive layer and a portion provided between the third conductive layer and the seventh conductive layer. The second insulating member is provided along the first direction above the first insulating member, and comprises a portion provided between the fourth conductive layer and the eighth conductive layer and a portion provided between the fifth conductive layer and the ninth conductive layer. The first pillar and a second pillar are in contact with the second conductive layer, the third conductive layer, the sixth conductive layer, and the seventh conductive layer. The first pillar and the second pillar are provided to sandwich the first insulating member in a third direction intersecting both the first direction and the second direction. The third pillar and a fourth pillar are in contact with the fourth conductive layer, the fifth conductive layer, the eighth conductive layer, and the ninth conductive layer. The third pillar and the fourth pillar are provided to sandwich the second insulating member in the third direction. The first pillar is provided along the first insulating member, and comprises a first semiconductor layer coupled to the first conductive layer. The second pillar is provided along the first insulating member, and comprises a second semiconductor layer coupled to the first conductive layer. The third pillar is provided along the second insulating member, and comprises a third semiconductor layer coupled to the first semiconductor layer. The fourth pillar is provided along the second insulating member, and comprises a fourth semiconductor layer coupled to the second semiconductor layer. A distance between the first pillar and the second pillar in the third direction in a cross section including the second conductive layer and the sixth conductive layer is smaller than a distance between the first pillar and the second pillar in the third direction in a cross section including the third conductive layer and the seventh conductive layer. A distance between the third pillar and the fourth pillar in the third direction in a cross section including the fourth conductive layer and the eighth conductive layer is greater than a distance between the third pillar and the fourth pillar in the third direction in a cross section including the fifth conductive layer and the ninth conductive layer.

Hereinafter, an embodiment will be described with reference to the drawings. The embodiment exemplifies a device and a method for embodying the technical idea of the invention. The drawings are schematic or conceptual, and the dimensions, ratios, and the like in each drawing are not necessarily the same as actual ones. The technical idea of the present invention is not specified by the shapes, structures, arrangements, and the like of the constituent elements.

Note that, in the following description, constituent elements having substantially the same functions and configurations are denoted by the same symbols. Numbers after the letters constituting the reference symbols are referred to by reference symbols including the same letters, and are used to differentiate elements having similar configurations from each other. Similarly, letters after the numbers constituting the reference symbols are referred to by reference symbols including the same numbers, and are used to differentiate elements having similar configurations from each other. In a case where it is not necessary to differentiate elements denoted by reference symbols including the same letters or numbers from each other, each of these elements is referred to by the reference symbol including only the letters or the numbers.

Embodiment

Hereinafter, a semiconductor memory device 1 according to an embodiment will be described.

<1> Configuration

<1-1> Overall Configuration of Semiconductor Memory Device 1

FIG. 1 illustrates a configuration example of the semiconductor memory device 1 according to the embodiment. The semiconductor memory device 1 is a NAND-type flash memory capable of storing data in a non-volatile manner, and can be controlled by an external memory controller 2.

As illustrated in FIG. 1, the semiconductor memory device 1 includes, for example, a memory cell array 10, a command register 11, an address register 12, a sequencer 13, a driver module 14, a row decoder module 15, and a sense amplifier module 16.

The memory cell array 10 includes a plurality of blocks BLK0 to BLK*n* (n being an integer of 1 or more). The block BLK is a set of a plurality of memory cells capable of storing data in a non-volatile manner, and is used as, for example, an erase unit of data. A plurality of bit lines and a plurality of word lines are provided in the memory cell array 10. Each memory cell is associated with, for example, one bit line and one word line. A configuration of the memory cell array 10 will be described in detail later.

The command register 11 holds a command CMD that the semiconductor memory device 1 received from the memory controller 2. The command CMD includes, for example, a command for causing the sequencer 13 to execute a read operation, a write operation, an erase operation, and the like.

The address register 12 holds address information ADD that the semiconductor memory device 1 received from the memory controller 2. The address information ADD includes, for example, a block address BAd, a page address PAd, and a column address CAd. For example, the block address BAd, the page address PAd, and the column address CAd are used for selecting a block BLK, a word line, and a bit line, respectively.

The sequencer 13 controls the overall operation of the semiconductor memory device 1. For example, the sequencer 13 controls the driver module 14, the row decoder module 15, the sense amplifier module 16, and the like based on the command CMD held in the command register 11 to execute the read operation, the write operation, the erase operation, and the like.

The driver module 14 generates a voltage used in the read operation, the write operation, the erase operation, and the like. Then, for example, the driver module 14 applies the generated voltage to a signal line corresponding to the word line selected based on the page address PAd held in the address register 12.

The row decoder module 15 selects one block BLK in the corresponding memory cell array 10 based on the block address BAd held in the address register 12. Then, the row decoder module 15 transfers, for example, the voltage applied to the signal line corresponding to the selected word line to the selected word line in the selected block BLK.

In the write operation, the sense amplifier module 16 applies a predetermined voltage to each bit line according to write data DAT received from the memory controller 2. In the read operation, the sense amplifier module 16 determines the data stored in the memory cell based on the voltage of the bit line, and transfers the determination result as read data DAT to the memory controller 2.

The semiconductor memory device 1 and the memory controller 2 described above may constitute one semiconductor device by combination thereof. As such a semiconductor device, for example, a memory card such as an SD™ card, a solid state drive (SSD), and the like are named.

<1-2> Circuit Configuration of Memory Cell Array 10

FIG. 2 illustrates an example of a circuit configuration of the memory cell array 10 included in the semiconductor memory device 1 according to the embodiment. Each block BLK includes, for example, four string units SU0 to SU3, and two string units SU0 and SU1 included in the same block BLK are depicted in FIG. 2.

As illustrated in FIG. 2, each string unit SU includes a plurality of memory groups MG. The plurality of memory groups MG are associated with bit lines BL0 to BL*m* (m being an integer of 1 or more), respectively. Each memory group MG includes two NAND strings NSa and NSb. The NAND string NSa includes memory cell transistors MCa0 to MCa7 and select transistors STa1 and STa2. The NAND string NSb includes memory cell transistors MCb0 to MCb7 and select transistors STb1 and STb2.

The select transistors STa1 and STb1 and the select transistors STa2 and STb2 are each used for selecting each of the string units SU and the NAND strings NS. The memory cell transistors MCa and MCb each include a control gate and a charge storage layer, and hold data in a non-volatile manner. Hereinafter, an example of a specific coupling state of elements in the memory group MG will be described by focusing on one memory group MG.

In the NAND string NSa, the memory cell transistors MCa0 to MCa7 are coupled in series. A source of the select transistor STa1 is coupled to one end of the memory cell transistors MCa0 to MCa7 coupled in series. The other end of the memory cell transistors MCa0 to MCa7 coupled in series is coupled to a drain of the select transistor STa2.

In the NAND string NSb, the memory cell transistors MCb0 to MCb7 are coupled in series. A source of the select transistor STb1 is coupled to one end of the memory cell transistors MCb0 to MCb7 coupled in series. The other end of the memory cell transistors MCb0 to MCb7 coupled in series is coupled to a drain of the select transistor STb2.

Drains of the select transistors STa1 and STb1 are each coupled to the bit line BL associated with the memory group MG. Sources of the select transistors STa2 and STb2 are each coupled to a source line SL.

Gates of a plurality of the select transistors STa1 included in the same block BLK are each coupled to a common select gate line SGDa for each string unit SU. Specifically, the select transistors STa1 included in the string unit SU0 are coupled to a select gate line SGDa0. The select transistors STa1 included in the string unit SU1 are coupled to a select gate line SGDa1. Similarly, the select transistors STa1 included in the string units SU2 and SU3 (not illustrated) are coupled to select gate lines SGDa2 and SGDa3, respectively.

Gates of a plurality of the select transistors STb1 included in the same block BLK are each coupled to a common select gate line SGDb for each string unit SU. Specifically, the select transistors STb1 included in the string unit SU0 are coupled to a select gate line SGDb0. The select transistors STb1 included in the string unit SU1 are coupled to a select gate line SGDb1. Similarly, the select transistors STb1 included in the string units SU2 and SU3 (not illustrated) are coupled to select gate lines SGDb2 and SGDb3, respectively.

The respective control gates of the memory cell transistors MCa0 to MCa7 included in the same block BLK are coupled to word lines WLa0 to WLa7, respectively. The respective control gates of the memory cell transistors MCb0 to MCb7 included in the same block BLK are coupled to word lines WLb0 to WLb7, respectively.

Gates of a plurality of the select transistors STa2 included in the same block BLK are each coupled to a select gate line SGSa. Gates of a plurality of the select transistors STb2 included in the same block BLK are each coupled to a select gate line SGSb.

In the circuit configuration of the memory cell array described above, the bit line BL is shared by, for example, the memory groups MG (sets of the NAND strings NSa and NSb) to which the same column address is assigned. The source line SL is shared among, for example, the plurality of blocks BLK. The word lines WLa and WLb, the select gate lines SGDa and SGDb, and the select gate lines SGSa and SGSb may each be independently controlled.

Note that, in the above description, a case has been exemplified where the select gate lines SGDa0 to SGDa3 and SGDb0 to SGDb3 are independent of each other, but there may be a case where the select gate line SGD may be shared between adjacent string units SU. In this case, for example, functions of two types of select gate lines SGD from among the select gate lines SGDa0 to SGDa3 and SGDb0 to SGDb3 may be assigned to one interconnect corresponding to the select gate line SGD. Alternatively, a function of one type of select gate line SGD may be assigned to two or more interconnects.

<1-3> Structure of Memory Cell Array 10

Hereinafter, an example of the structure of the memory cell array 10 included in the semiconductor memory device 1 according to the embodiment will be described. Note that, in the drawings referred to below, an X direction corresponds to an extending direction of the word lines WL, a Y direction corresponds to an extending direction of the bit lines BL, and a Z direction corresponds to a vertical direction with respect to a surface of a semiconductor substrate 20 used for forming the semiconductor memory device 1. Hatching is appropriately added in plan views to make the drawings easier to see. The hatching added in the plan views is not necessarily related to materials or characteristics of constituent elements to which the hatching is added.

(Planar Layout of Memory Cell Array 10)

Figure 3:
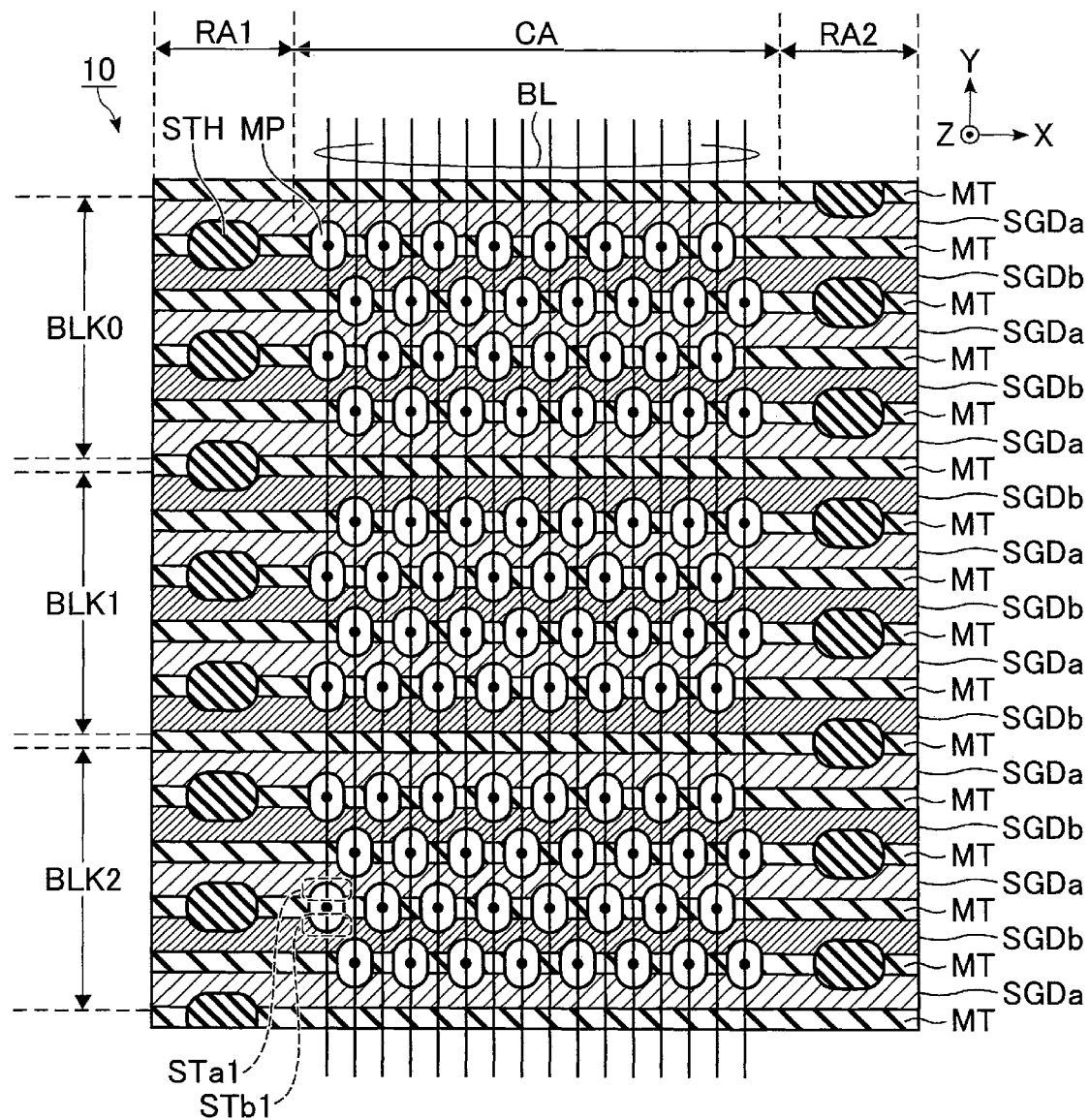
FIG. 3 is a plan view illustrating an example of a planar layout of the memory cell array included in the semiconductor memory device according to the embodiment.

FIG. 3 illustrates an example of a planar layout of the memory cell array 10 included in the semiconductor memory device 1 according to the embodiment by focusing on the select gate lines SGDa and SGDb. In FIG. 3, a region corresponding to three blocks BLK0 to BLK2 arranged in order is extracted.

As illustrated in FIG. 3, the region of the memory cell array 10 includes a cell region CA and replacement regions RA1 and RA2. In addition, the memory cell array 10 includes a plurality of memory trenches MT, a plurality of memory pillars MP, and a plurality of replacement holes STH.

The cell region CA and the replacement regions RA1 and RA2 are each a region extending in the Y direction. The cell region CA is sandwiched between the replacement regions RA1 and RA2 in the X direction. The select gate lines SGDa and SGDb each include a portion extending along the X direction, and cross the cell region CA and the replacement regions RA1 and RA2. The select gate lines SGDa and SGDb are alternately arranged in the Y direction.

Each memory trench MT is arranged between adjacent select gate lines SGDa and SGDb. The memory trench MT includes a portion extending along the X direction, and separates interconnect layers adjacent in the Y direction. The memory trench MT is filled with, for example, an insulator.

Each memory pillar MP functions as the memory group MG, and is arranged to overlap one memory trench MT in the cell region CA. Each memory pillar MP divides the overlapping memory trench MT, and is in contact with each of the select gate lines SGDa and SGDb adjacent to the divided memory trench MT. Portions where the memory pillars MP and the select gate lines SGDa face each other function as the select transistors STa1. Portions where the memory pillars MP and the select gate lines SGDb face each other function as the select transistors STb1.

At least one bit line BL is provided to overlap each memory pillar MP, and the one bit line BL is electrically coupled to the memory pillar MP. In a region corresponding to each block BLK, a plurality of memory pillars MP are arranged in four rows in a staggered manner, for example. The memory trench MT where the memory pillars MP do not overlap is arranged at a boundary portion between adjacent blocks BLK. In other words, the memory cell array 10 is divided into units of blocks BLK by being partitioned by the memory trenches MT where the memory pillars MP do not overlap.

Each replacement hole STH is used at the time of forming stacked interconnects. For example, the plurality of replacement holes STH include replacement holes STH arranged to overlap memory trenches MT at even-number-th rows (even-number-th memory trenches MT) in the replacement region RA1, and replacement holes STH arranged to overlap memory trenches MT at odd-number-th rows (odd-number-th memory trenches MT) in the replacement region RA2. Each replacement hole STH divides the overlapping memory trench MT, and is in contact with each of the select gate lines SGDa and SGDb adjacent to the divided memory trench MT. The replacement hole STH is filled with, for example, an insulator.

Figure 4:
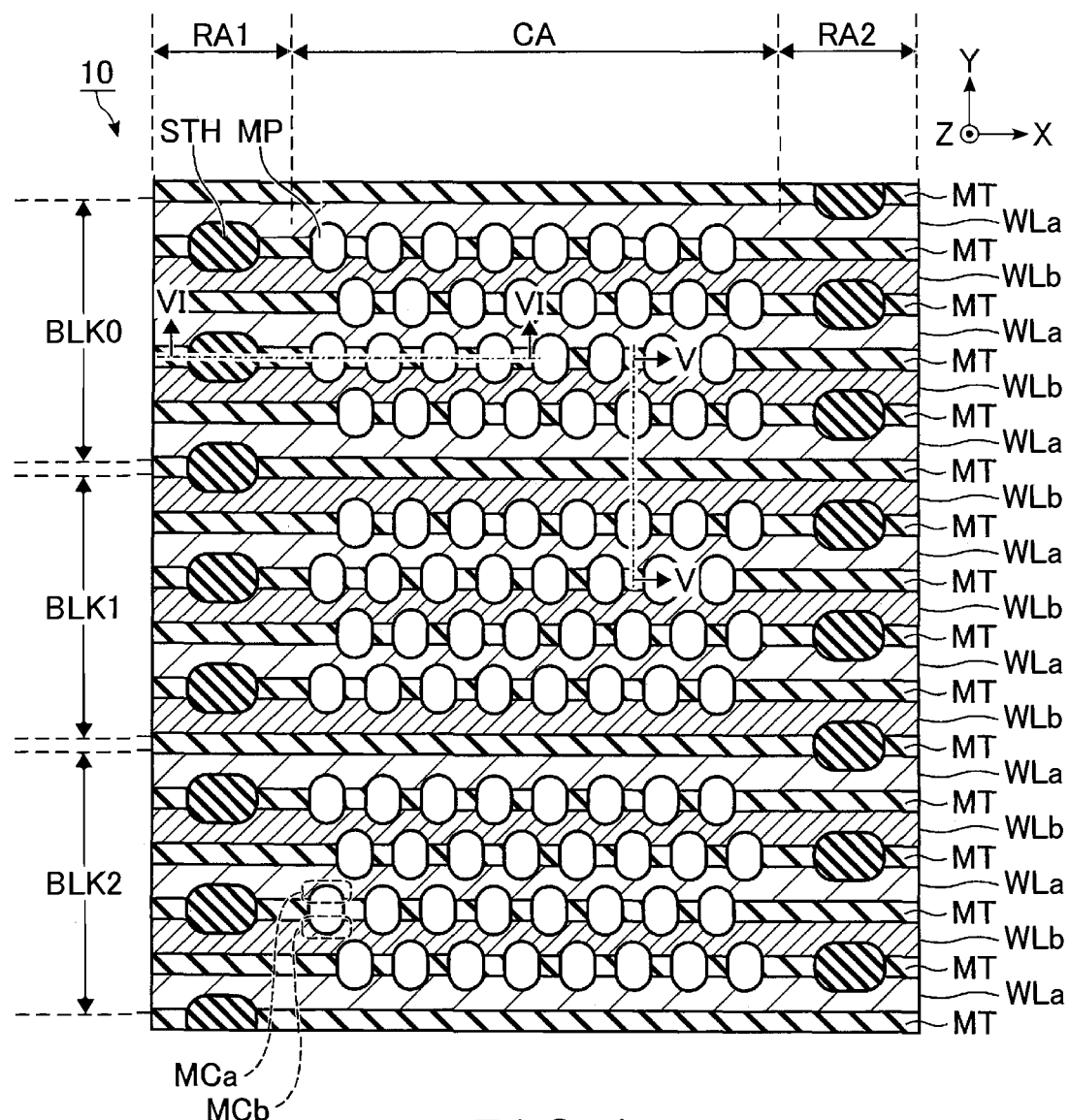
FIG. 4 is a plan view illustrating an example of a planar layout of the memory cell array included in the semiconductor memory device according to the embodiment.

FIG. 4 illustrates an example of a planar layout of the memory cell array 10 included in the semiconductor memory device 1 according to the embodiment by focusing on the word lines WLa and WLb. In FIG. 4, a region including the blocks BLK0 to BLK2 is extracted.

As illustrated in FIG. 4, the word lines WLa and WLb each include a portion extending along the X direction, and cross the cell region CA and the replacement regions RA1 and RA2. The word lines WLa and WLb are alternately arranged in the Y direction. The memory trenches MT are arranged between the word lines WLa and WLb.

The word lines WLa and WLb each include portions in contact with each of the memory pillars MP and the replacement holes STH. Portions where the memory pillars MP and the word lines WLa face each other function as the memory cell transistors MCa. Portions where the memory pillars MP and the word lines WLb face each other function as the memory cell transistors MCb.

The word lines WLa and the word lines WLb each have a structure in which their ends are electrically coupled to each other for each block BLK in a region not illustrated. For example, the word lines WL in the block BLK are electrically coupled by providing the word lines WL in a comb shape. The coupling is not limited thereto, and the word lines WL in the block BLK may be electrically coupled by coupling a set of line-shaped word lines WL via different interconnect layers.

(Cross-Sectional Structure of Memory Cell Array 10)

Figure 5:
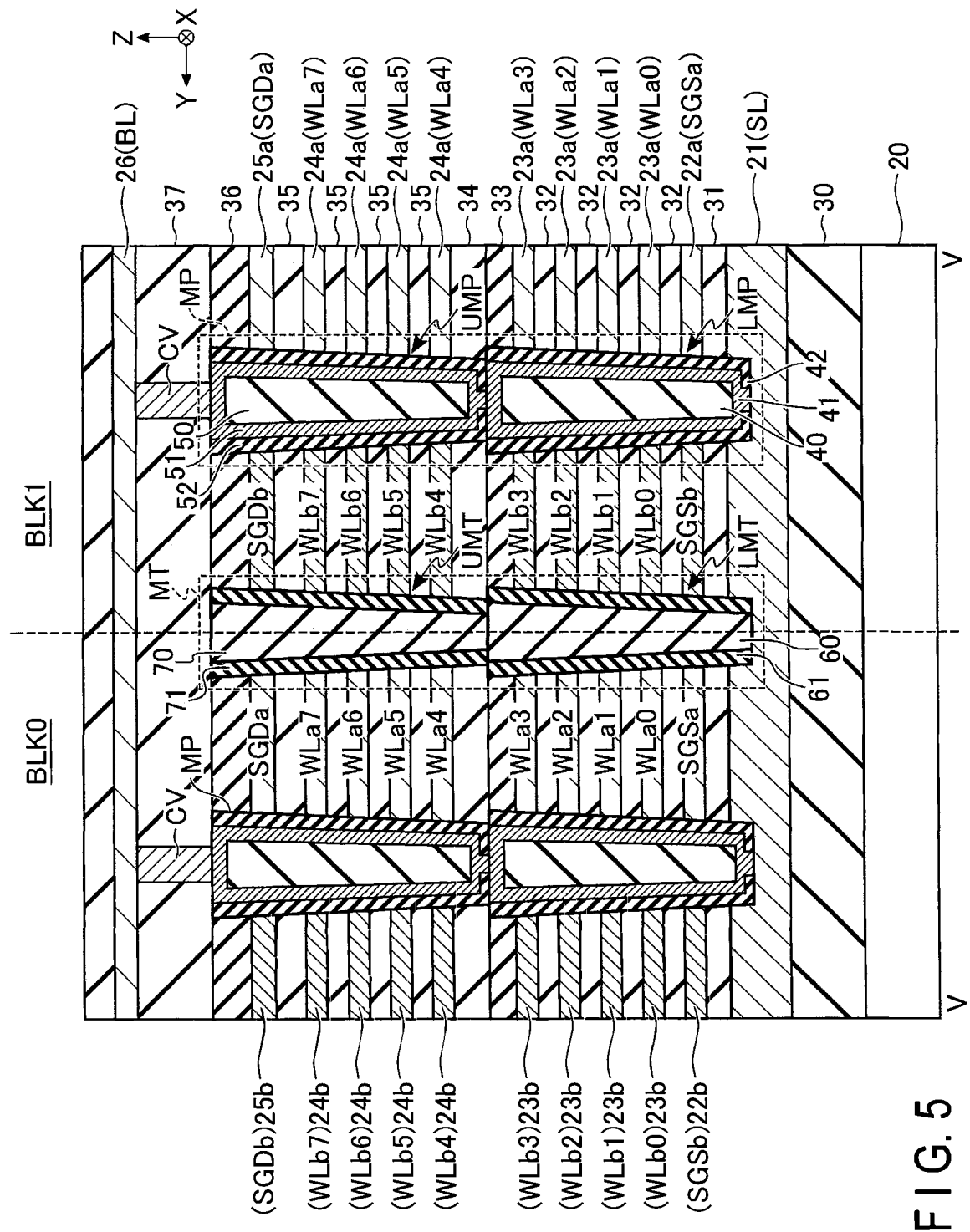
FIG. 5 is a cross-sectional view, taken along line V-V in FIG. 4, illustrating an example of a cross-sectional structure of the memory cell array included in the semiconductor memory device according to the embodiment.

FIG. 5 is a cross-sectional view taken along line V-V in FIG. 4, and illustrates an example of a cross-sectional structure of the memory cell array 10 including the memory trench MT at the boundary portion between the blocks BLK0 and BLK1 and the memory pillars MP.

As illustrated in FIG. 5, the memory cell array 10 includes, for example, conductive layers 21 to 26, insulating layers 30 to 37, and a plurality of contacts CV. Hereinafter, a cross-sectional structure of the memory cell array 10 will be described in detail in order from the lower layer.

The conductive layer 21 is provided above the semiconductor substrate 20 with the insulating layer 30 interposed therebetween. Although not illustrated, for example, a circuit such as the sense amplifier module 16 is provided inside the insulating layer 30. The conductive layer 21 is formed in a plate shape spreading along an XY plane, for example, and is used as the source line SL. The conductive layer 21 contains, for example, silicon (Si) doped with phosphorous (P). The conductive layer 21 may include a plurality of types of semiconductor layers, or may include a metal layer.

The conductive layer 22 is provided above the conductive layer 21 with the insulating layer 31 interposed therebetween. The conductive layer 22 includes, for example, a portion provided to extend along the X direction, and is used as the select gate line SGS. The conductive layer 22 contains, for example, tungsten (W).

The insulating layers 32 and the conductive layers 23 are alternately stacked above the conductive layer 22. The conductive layer 23 includes, for example, a portion provided to extend along the X direction. The plurality of stacked conductive layers 23 are used as the word lines WL0 to WL3, respectively, in order from a semiconductor substrate 20 side. The conductive layer 23 contains, for example, tungsten (W).

The insulating layer 33 is provided above the uppermost conductive layer 23. The insulating layer 34 is provided above the insulating layer 33. The conductive layers 24 and the insulating layers 35 are alternately stacked above the insulating layer 34. The conductive layer 24 includes, for example, a portion provided to extend along the X direction. The plurality of stacked conductive layers 24 are used as the word lines WL4 to WL7, respectively, in order from the semiconductor substrate 20 side. The conductive layer 24 contains, for example, tungsten (W).

The conductive layer 25 is provided above the uppermost conductive layer 24 with the insulating layer 35 interposed therebetween. The conductive layer 25 includes, for example, a portion provided to extend along the X direction, and is used as the select gate line SGD. The conductive layer 25 contains, for example, tungsten (W).

The insulating layer 36 is provided above the conductive layer 25. The conductive layer 26 is provided above the insulating layer 36 with the insulating layer 37 interposed therebetween. The conductive layer 26 includes, for example, a portion provided to extend along the Y direction, and is used as the bit line BL. That is, a plurality of conductive layers 26 are arrayed along the X direction in a region not illustrated. The conductive layer 26 contains, for example, copper (Cu).

The memory pillars MP are each provided to extend along the Z direction, and penetrate the conductive layers 22 to 25 and the insulating layers 31 to 36. Specifically, the memory pillars MP each include, for example, a lower pillar LMP and an upper pillar UMP connected in the Z direction. Hereinafter, an example of a structure of the lower pillar LMP and the upper pillar UMP will be described by focusing on a set of the lower pillar LMP and the upper pillar UMP included in the same memory pillar MP.

The lower pillar LMP penetrates the conductive layers 22 and 23 and the insulating layers 31 to 33. The lower pillar LMP includes a core member 40, a semiconductor layer 41, and a stacked film 42. The core member 40 is provided to extend along the Z direction. The upper end of the core member 40 is included in a layer above the conductive layer 23. The lower end of the core member 40 is included in a layer in which the conductive layer 21 is formed. The semiconductor layer 41 covers the periphery of the core member 40. For example, the bottom of the semiconductor layer 41 is in contact with the conductive layer 21. The stacked film 42 covers the side surface and the bottom surface of the semiconductor layer 41 except for the contact portion between the semiconductor layer 41 and the conductive layer 21.

The upper pillar UMP penetrates the conductive layers 24 and 25 and the insulating layers 34 to 36. The upper pillar UMP includes a core member 50, a semiconductor layer 51, and a stacked film 52. The core member 50 is provided to extend along the Z direction. The upper end of the core member 50 is included in a layer above the conductive layer 25. The lower end of the core member 50 is included, for example, in a layer in which the insulating layer 34 is formed. The semiconductor layer 51 covers the periphery of the core member 50. For example, the bottom of the semiconductor layer 51 in the upper pillar UMP is in contact with the top of the semiconductor layer 41 in the lower pillar LMP. The stacked film 52 covers the side surface and the bottom surface of the semiconductor layer 51 except for the contact portion between the semiconductor layer 41 and the semiconductor layer 51, for example.

A columnar contact CV is provided above the semiconductor layer 51 in the memory pillar MP. One conductive layer 26 (bit line BL) is in contact with the top of the contact CV. The memory pillars MP corresponding to the memory groups MG associated with the same column address are coupled to the common conductive layer 26 with the contacts CV interposed therebetween.

The memory trenches MT each divide the conductive layers 22 and 23, the insulating layers 31 to 33, conductive layers 24 and 25, and the insulating layers 34 to 36. As a result, the conductive layer 22 is separated into conductive layers 22a and 22b corresponding to the select gate lines SGSa and SGSb, respectively. The conductive layers 23 are separated into conductive layers 23a and 23b corresponding to the word lines WLa and WLb, respectively. The conductive layers 24 are separated into conductive layers 24a and 24b corresponding to the word lines WLa and WLb, respectively. The conductive layer 25 is separated into conductive layers 25a and 25b corresponding to the select gate lines SGDa and SGDb, respectively.

The memory trenches MT each include, for example, a lower trench LMT and an upper trench UMT arranged in the Z direction. Hereinafter, an example of a structure of the lower trench LMT and the upper trench UMT will be described by focusing on a set of the lower trench LMT and the upper trench UMT included in the same memory trench MT. Note that the lower trench LMT and the upper trench UMT may be in contact with each other, or may be separated from each other.

The lower trench LMT divides the conductive layers 22 and 23 and insulating layers 31 to 33. The lower trench LMT includes insulating layers 60 and 61. The insulating layer 60 is formed in a plate shape spreading along an XZ plane. The upper end of the insulating layer 60 is included in a layer above the conductive layer 23. The lower end of the insulating layer 60 is included in a layer including the conductive layer 21. The insulating layer 61 has a composition different from that of the insulating layer 60, and is provided on the side surface of the insulating layer 60. The insulating layer 60, and the conductive layers 22 and 23 are separated with the insulating layer 61 interposed therebetween. In this manner, at least two types of insulating layers are provided in the lower trench LMT.

The upper trench UMT divides the conductive layers 24 and 25 and the insulating layers 34 to 36. The upper trench UMT includes insulating layers 70 and 71. The insulating layer 70 is formed in a plate shape spreading along the XZ plane. The upper end of the insulating layer 70 is included in a layer above the conductive layer 25. The lower end of the insulating layer 70 is included in a layer between the conductive layer 23 and the conductive layer 24. The insulating layer 71 has a composition different from that of the insulating layer 70, and is provided on the side surface of the insulating layer 70. The insulating layer 70, and the conductive layers 24 and 25 are separated with the insulating layer 71 interposed therebetween. In this manner, at least two types of insulating layers are provided in the upper trench UMT.

Note that, in the structure of the memory cell array 10 described above, the total thickness of the insulating layers 33 and 34 including the joint portion between the lower pillar LMP and the upper pillar UMP is greater than that of the insulating layer 32, and is greater than that of the insulating layer 35. In other words, the distance between the uppermost conductive layer 23a and the lowermost conductive layer 24a in the Z direction is greater than the distance between adjacent conductive layers 23a, and is greater than the distance between adjacent conductive layers 24a.

In addition, a configuration for relaying the upper pillar UMP, the lower pillar LMP, and the joint portion may be provided between the upper pillar UMP and the lower pillar LMP. In each memory pillar MP, it suffices that at least the semiconductor layer 51 in the upper pillar UMP and the semiconductor layer 41 in the lower pillar LMP are electrically coupled to each other. An etching stopper for forming a structure corresponding to the upper pillar UMP may be provided between the insulating layer 33 and the insulating layer 34.

Figure 6:
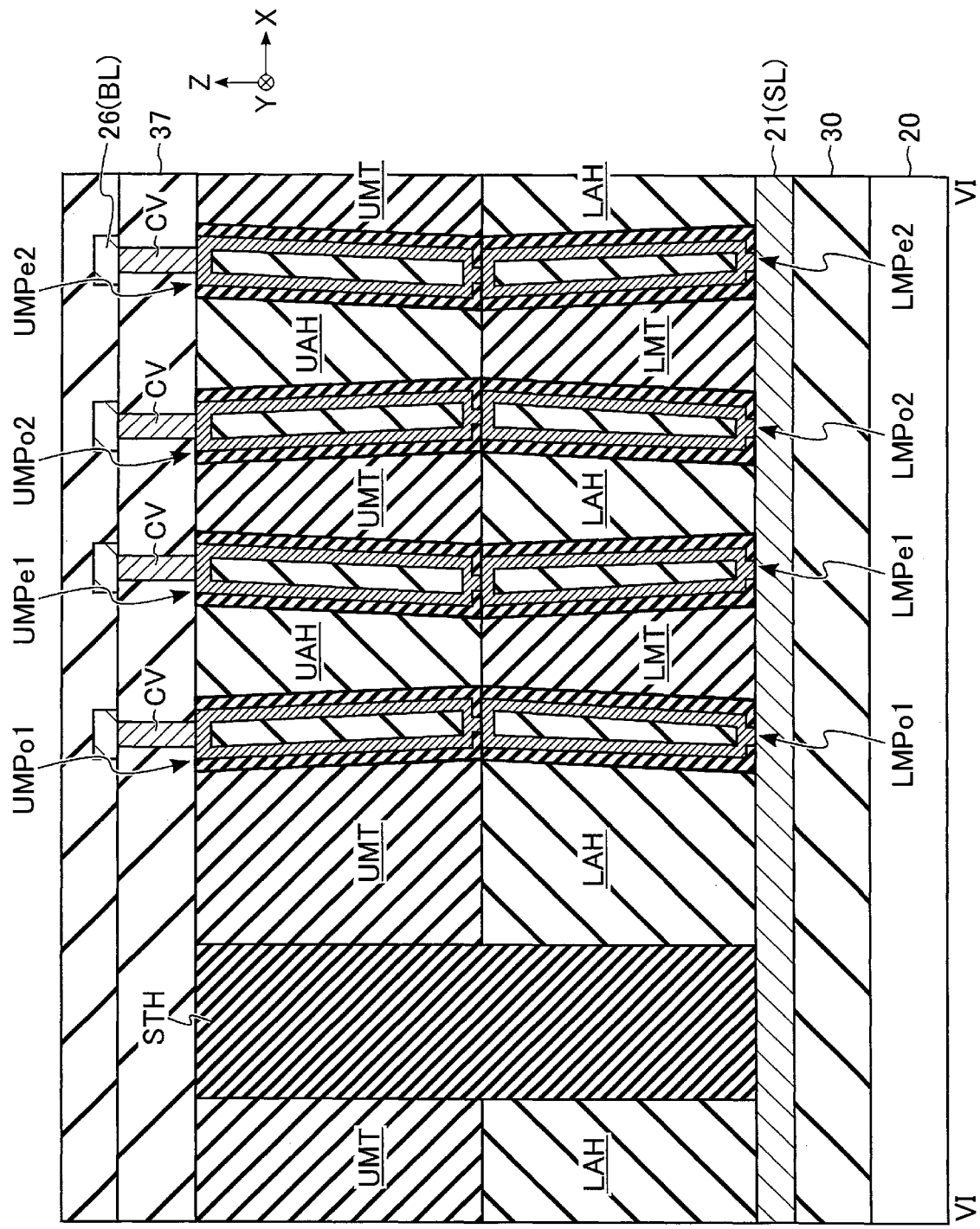
FIG. 6 is a cross-sectional view, taken along line VI-VI in FIG. 4, illustrating an example of a cross-sectional structure of the memory cell array included in the semiconductor memory device according to the embodiment.

FIG. 6 is a cross-sectional view taken along line VI-VI in FIG. 4, and illustrates an example of a cross-sectional structure of the memory cell array 10 including the memory pillars MP and the replacement hole STH. Note that, in the semiconductor memory device 1 according to the embodiment, four memory pillars MP arranged in the X direction may be regarded as one set. Structures similar to the one set of the memory pillars MP are repeatedly arranged in the X direction. Hereinafter, the lower pillars LMP in the four memory pillars MP arranged in the X direction are referred to as "LMPo1", "LMPe1", "LMPo2", and "LMPe2", respectively, in order from one closest to the replacement hole STH. The upper pillars UMP in the four memory pillars MP arranged in the X direction are referred to as "UMPo1", "UMPe1", "UMPo2", and "UMPe2", respectively, in order from one closest to the replacement hole STH.

Figure 7:
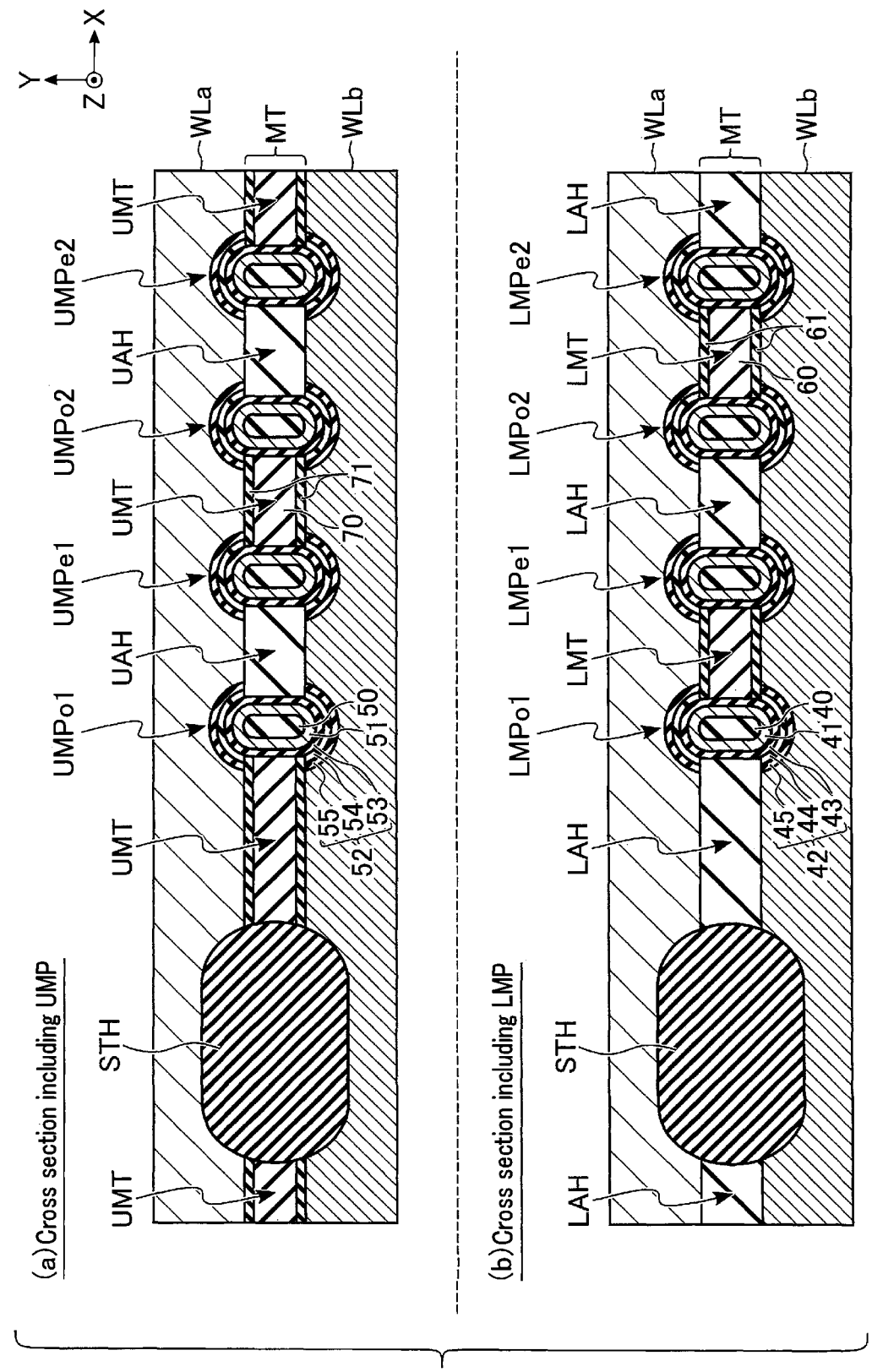
FIG. 7 is a cross-sectional view illustrating an example of a cross-sectional structure of the memory cell array in the semiconductor memory device according to the embodiment.

As illustrated in FIG. 7, the lower trenches LMT are arranged between the lower pillars LMPo1 and LMPe1, and between the lower pillars LMPo2 and LMPe2, respectively. Holes LAH filled with insulators are arranged between the lower pillars LMPe1 and LMPo2, and between the lower pillar LMPo1 and the replacement hole STH.

The hole LAH is formed by removing portions of the insulating layers in the formed lower trench LMT. The hole LAH is used for forming the lower pillars LMP adjacent to the hole LAH. The memory cell array 10 is provided with a structure in which the holes LAH and the lower trenches LMT are alternately arranged in the X direction. Therefore, the lower pillars LMP are each arranged between the hole LAH and the lower trench LMT adjacent to each other.

Further, for example, in a cross section along the XZ plane, the hole LAH has a tapered shape, and the lower trench LMT has a reverse tapered shape. The lower pillar LMP arranged between the hole LAH and the lower trench LMT adjacent to each other has a shape along each of the hole LAH and the lower trench LMT adjacent to each other. The shape of the lower pillar LMP (for example, the inclination of the lower pillar LMP) is determined based on the shape of the hole LAH.

The upper trenches UMT are arranged between the upper pillar UMPe1 and UMPo2, and between the upper pillar UMPo1 and the replacement hole STH, respectively. Holes UAH filled with insulators are arranged between the upper pillars UMPo1 and UMPe1, and between the upper pillars UMPo2 and UMPe2.

The hole UAH is formed by removing portions of the insulating layers in the formed upper trench UMT. The hole UAH is used for forming the upper pillars UMP adjacent to the hole UAH. The memory cell array 10 is provided with a structure in which the holes UAH and the upper trenches UMT are alternately arranged in the X direction. Therefore, the upper pillars UMP are each arranged between the hole UAH and the upper trench UMT adjacent to each other.

Further, for example, in the cross section along the XZ plane, the hole UAH has a tapered shape, and the upper trench UMT has a reverse tapered shape. The upper pillar UMP arranged between the hole UAH and the upper trench UMT adjacent to each other has a shape along each of the hole UAH and the upper trench UMT adjacent to each other. The shape of the upper pillar UMP (for example, the inclination of the upper pillar UMP) is determined based on the shape of the hole UAH.

Further, the upper trench UMT is adjacent to the hole LAH in the Z direction. The hole UAH is adjacent to the lower trench LMT in the Z direction. That is, in plan view, the holes UAH and the holes LAH are arranged in a staggered manner in the X direction. Similarly, in plan view, the upper trenches UMT and the lower trenches LMT are arranged in a staggered manner in the X direction.

The replacement hole STH divides the memory trench MT (for example, the hole LAH and the upper trench UMT). The replacement hole STH is filled with an insulator. The upper end of the insulator in the replacement hole STH is in contact with the insulating layer 37. The lower end of the insulator in the replacement hole STH is in contact with the conductive layer 21.

Further, in a region not illustrated, the replacement hole STH is in contact with each of the conductive layers 21, 22a, 22b, 23a, 23b, 24a, 24b, 25a, 25b, and 26, and the insulating layers 30 to 36. That is, the conductive layers 22a and 22b adjacent to each other, the conductive layers 23a and 23b adjacent to each other, the conductive layers 24a and 24b adjacent to each other, and the conductive layers 25a and 25b adjacent to each other are each electrically insulated from each other by a set of the insulators in the memory trench MT and the memory pillars MP that divide the insulators.

Further, in the semiconductor memory device 1 according to the embodiment, the memory trench MT divided by the replacement hole STH is provided to have a width in the X direction greater than those of the memory trenches MT provided in other regions. In this example, the hole LAH adjacent to the lower pillar LMPo1 is provided to have a width in the X direction greater than those of other holes LAH, and the upper trench UMT adjacent to the upper pillar UMPo1 is provided to have a width in the X direction greater than those of other upper trenches UMT. The replacement hole STH divides the set of the hole LAH and the upper trench UMT that have large widths.

FIG. 7 illustrates an example of a cross-sectional structure of the memory cell array 10 in the semiconductor memory device 1 according to the embodiment. FIG. 7A corresponds to a cross section parallel to the surface of the semiconductor substrate 20 and including the upper pillars UMP. FIG. 7B corresponds to a cross section parallel to the surface of the semiconductor substrate 20 and including the lower pillars LMP.

As illustrated in FIG. 7A, the upper pillars UMPo1, UMPe1, UMPo2, and UMPe2, and the replacement hole STH are each in contact with each of the word lines WLa and WLb. The stacked film 52 in the upper pillar UMP includes a tunnel insulating film 53, an insulating film 54, and a block insulating film 55.

In the upper pillar UMP, the core member 50 is provided at the center of the upper pillar UMP. The semiconductor layer 51 surrounds the periphery of the core member 50. The tunnel insulating film 53 surrounds the periphery of the semiconductor layer 51. The insulating film 54 surrounds the periphery of the tunnel insulating film 53. The block insulating film 55 surrounds the periphery of the insulating film 54. The core member 50 includes, for example, an insulator such as silicon oxide. The semiconductor layer 51 contains, for example, silicon. The tunnel insulating film 53 and the block insulating film 55 each contain, for example, silicon oxide. The insulating film 54 contains, for example, silicon nitride.

The block insulating film 55 is in contact with each of the word lines WLa and WLb adjacent thereto. For example, the upper trench UMT divides portions of the insulating films 54 and portions of the block insulating films 55 in the contacting upper pillars UMP, and is in contact with the tunnel insulating films 53. The hole UAH divides portions of the insulating films 54 and portions of the block insulating films 55 in the contacting upper pillars UMP, and is in contact with the tunnel insulating films 53. Therefore, in this example, in each upper pillar UMP, a set of the insulating film 54 and the block insulating film 55 that is provided on a word line WLa side, and a set of the insulating film 54 and the block insulating film 55 that is provided on a word line WLb side are separated from each other.

As illustrated in FIG. 7B, the lower pillars LMPo1, LMPe1, LMPo2, and LMPe2, and the replacement hole STH are each in contact with each of the word lines WLa and WLb. The stacked film 42 in the lower pillar LMP includes a tunnel insulating film 43, an insulating film 44, and a block insulating film 45.

In the lower pillar LMP, the core member 40 is provided at the center of the lower pillar LMP. The semiconductor layer 41 surrounds the periphery of the core member 40. The tunnel insulating film 43 surrounds the periphery of the semiconductor layer 41. The insulating film 44 surrounds the periphery of the tunnel insulating film 43. The block insulating film 45 surrounds the periphery of the insulating film 44. The core member 40 includes, for example, an insulator such as silicon oxide. The semiconductor layer 41 contains, for example, silicon. The tunnel insulating film 43 and the block insulating film 45 each contain, for example, silicon oxide. The insulating film 44 contains, for example, silicon nitride.

The block insulating film 45 is in contact with each of the word lines WLa and WLb adjacent thereto. For example, the lower trench LMT divides portions of the insulating films 44 and portions of the block insulating films 45 in the contacting lower pillars LMP, and is in contact with the tunnel insulating films 43. The hole LAH divides portions of the insulating films 44 and portions of the block insulating films 45 in the contacting lower pillars LMP, and is in contact with the tunnel insulating films 43. Therefore, in this example, in each lower pillar LMP, a set of the insulating film 44 and the block insulating film 45 that is provided on the word line WLa side, and a set of the insulating film 44 and the block insulating film 45 that is provided on the word line WLb side are separated from each other.

In the semiconductor memory device 1 according to the embodiment described above, the memory cell transistors MCa and MCb use the insulating film 44 or 54 as a charge storage layer. The memory cell transistors MCa and MCb, and the select transistors STa1, STb1, STa2, and STb2 share channels (semiconductor layers 41 and 51). A set of the select transistors STa1 and STa2 and the memory cell transistors MCa0 to MCa7 that are arranged in the Z direction corresponds to the NAND string NSa. A set of the select transistors STb1 and STb2 and the memory cell transistors MCb0 to MCb7 that are arranged in the Z direction corresponds to the NAND string NSb.

Further, in the direction parallel to the surface of the semiconductor substrate 20 (for example, the Y direction), the memory cell transistors MCa0 to MCa7 respectively face the memory cell transistors MCb0 to MCb7, and the select transistors STa1 and STa2 respectively face the select transistors STb1 and STb2. In other words, the memory cell transistors MCa0 to MCa7 and the memory cell transistors MCb0 to MCb7 are respectively adjacent to each other, and the select transistors STa1 and STa2 and the select transistors STb1 and STb2 are respectively adjacent to each other, with the region divided by the memory trench MT interposed therebetween.

<2> Manufacturing Method

Figure 8:
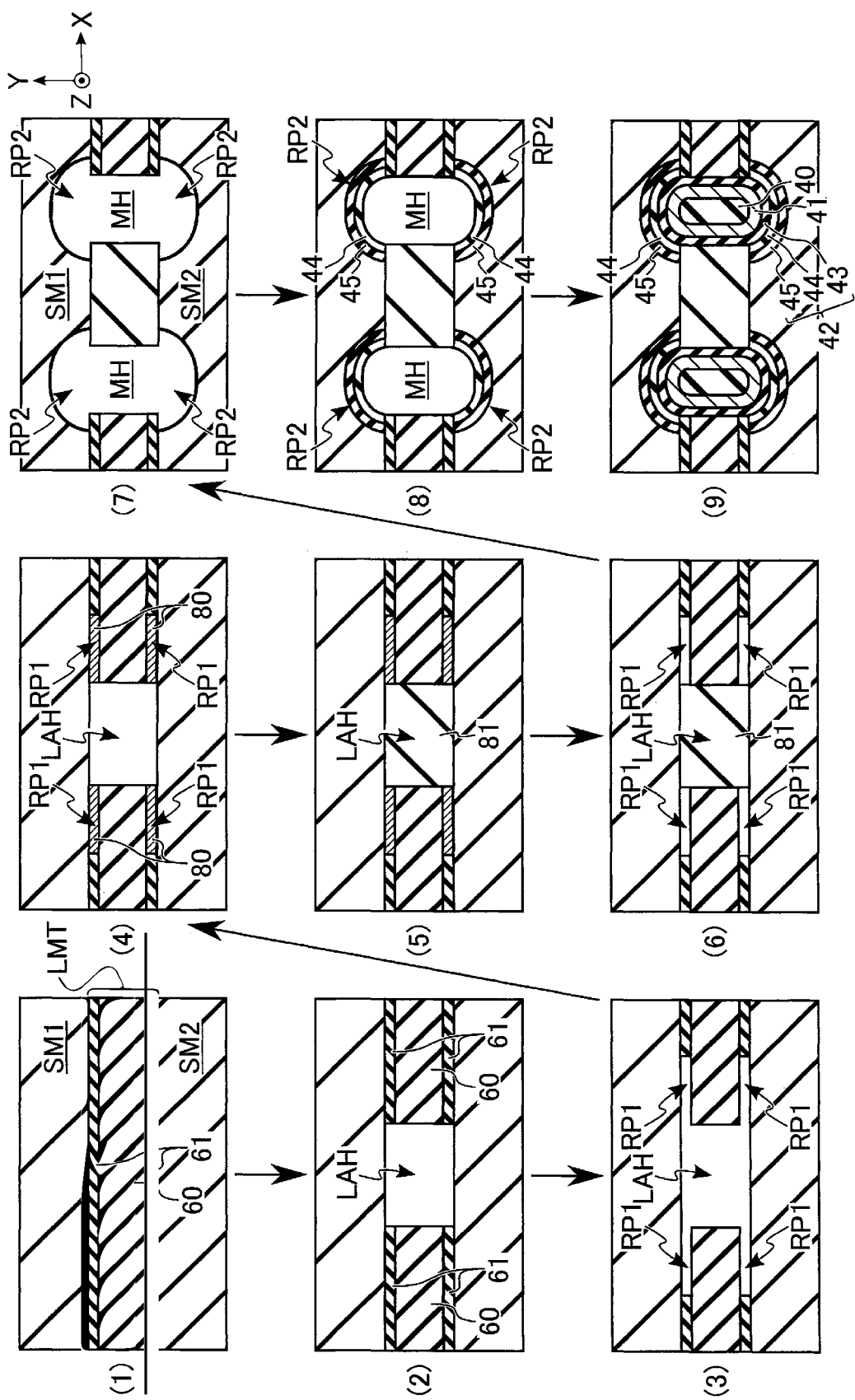
FIG. 8 is a schematic view illustrating an example of a method of forming the memory cell array in the semiconductor memory device according to the embodiment.
Figure 9:
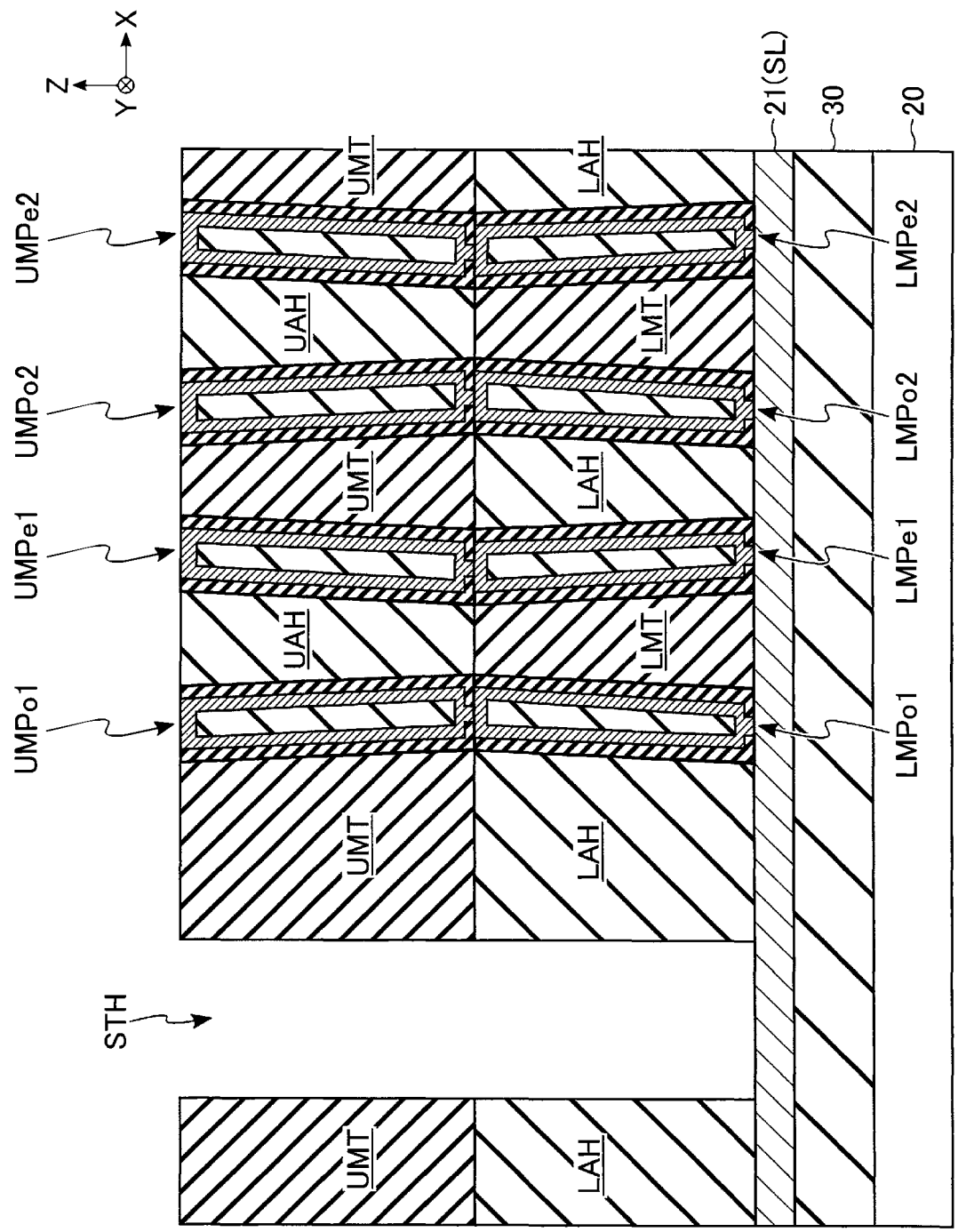
FIG. 9 is a cross-sectional view illustrating an example of the method of forming the memory cell array in the semiconductor memory device according to the embodiment.
Figure 10:
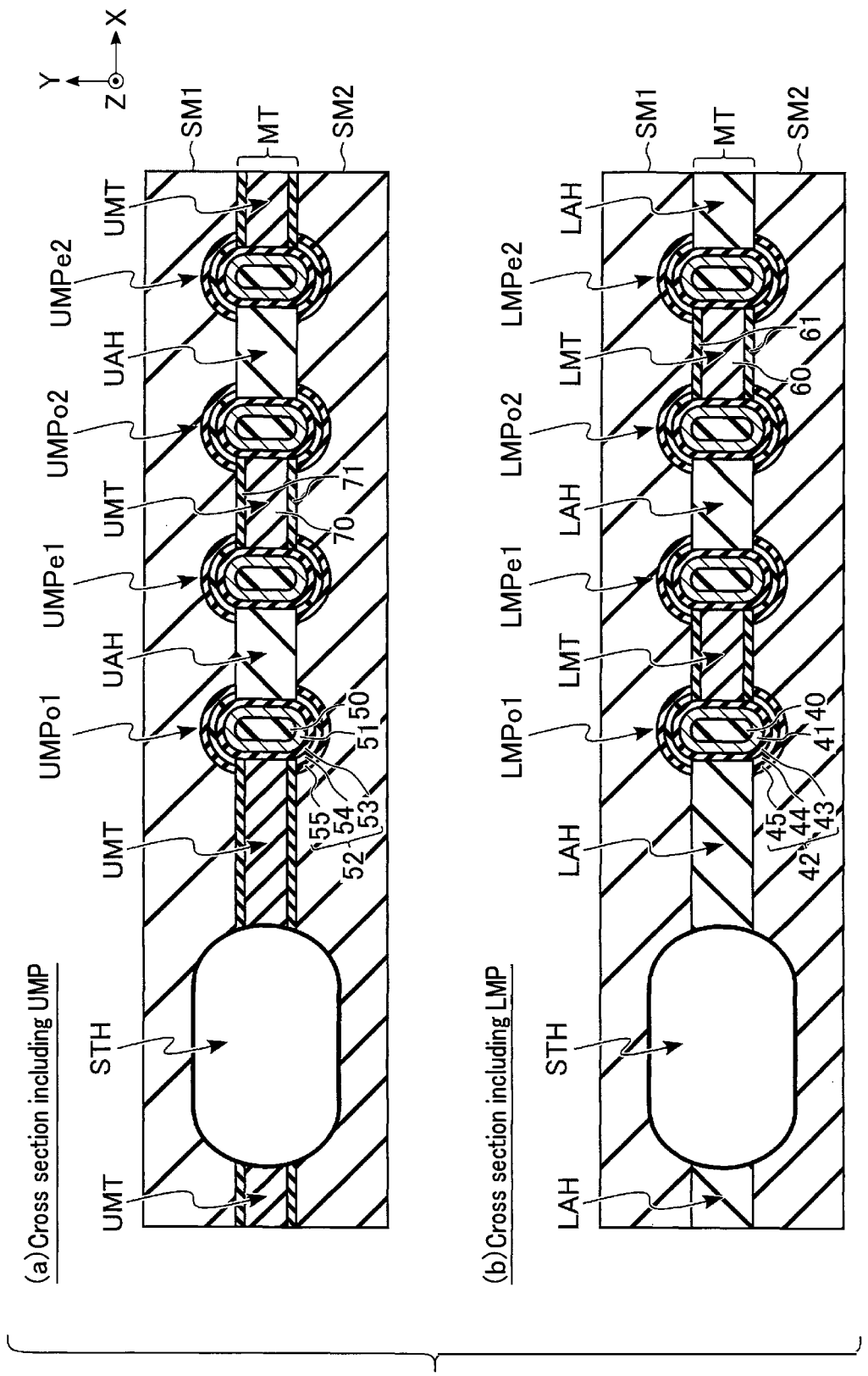
FIG. 10 is a cross-sectional view illustrating an example of the method of forming the memory cell array in the semiconductor memory device according to the embodiment.

Hereinafter, a method of forming the memory pillar MP in the semiconductor memory device 1 according to the embodiment will be briefly described using manufacturing steps related to the lower pillar LMP as examples, with reference to FIGS. 8 to 10. FIG. 8 illustrates an example of a flow of the method of forming the memory cell array 10 in the semiconductor memory device 1 according to the embodiment. FIGS. 9 and 10 illustrate examples of cross-sectional structures of the memory cell array 10 in the process of manufacturing the semiconductor memory device 1 according to the embodiment. FIGS. 9 and 10 depict regions similar to those in FIGS. 6 and 7, respectively.

First, sacrificial members SM and insulating layers are alternately stacked. Then, as illustrated in FIG. 8(1), a lower trench LMT that divides the sacrificial member SM is formed, and the insulating layers 61 and 60 are formed in this order in the lower trench LMT. Note that, in FIG. 8, in the divided sacrificial member SM, a portion corresponding to the word line WLa side is indicated as "SM1", and a portion corresponding to the word line WLb side is indicated as "SM2".

Next, as illustrated in FIG. 8(2), a hole LAH that divides the lower trench LMT is formed. It suffices that the space formed by the hole LAH is in contact with at least each of the insulating layers 61, of the corresponding lower trench LMT, provided on both sides in the Y direction. Then, as illustrated in FIG. 8(3), portions of the insulating layers 61 in the lower trench LMT are selectively removed through the hole LAH. In this step, for example, wet etching is performed under a condition that increases the etching selectivity between the insulating layer 60 and the insulating layer 61. As a result, four recesses RP1 are formed for each hole LAH.

Next, as illustrated in FIG. 8(4), a sacrificial member 80 is formed in each recess RP1. Briefly, first, the sacrificial member 80 is formed in the hole LAH. Then, the sacrificial member 80 in the hole LAH is removed to separate the sacrificial members 80 in the recesses RP1 from each other. As the sacrificial member 80, for example, polysilicon is used. Then, as illustrated in FIG. 8(5), the hole LAH is filled with an insulator 81. As the insulator 81, for example, a silicon oxide film is used.

Next, as illustrated in FIG. 8(6), the sacrificial members 80 in the recesses RP1 are selectively removed. In this step, for example, wet etching is performed under a condition that increases the etching selectivity between the sacrificial member 80 and each of the sacrificial members SM and other insulating layers. As a result, four spaces of the recesses RP1 are formed adjacent to the hole LAH filled with the insulator 81.

Next, as illustrated in FIG. 8(7), memory holes MH including recesses RP2 are formed. Briefly, first, portions of the sacrificial members SM1 and SM2 are selectively removed through the recesses RP1 to form the recesses RP2. The recess RP2 is provided so as not to be in contact with at least the recess RP2 adjacent in the X direction. Then, the insulating layer 60 between the recesses RP2 adjacent in the Y direction is selectively removed to form the memory hole MH including two recesses RP2 adjacent in the Y direction.

Next, as illustrated in FIG. 8(8), the block insulating films 45 and the insulating films 44 are formed in the recesses RP2. Briefly, first, the block insulating film 45 and the insulating film 44 are formed in this order in the memory hole MH. Then, the block insulating film 45 and the insulating film 44 formed in a region intersecting the lower trench LMT are removed. As a result, the block insulating films 45 and the insulating films 44 in the recesses RP2 adjacent in the Y direction are separated from each other.

Next, as illustrated in FIG. 8(9), the tunnel insulating films 43, the semiconductor layers 41, and the core members 40 are formed in this order in the memory holes MH. As a result, a layer structure corresponding to the memory cell transistor MCa and a layer structure corresponding to the memory cell transistor MCb are provided in each memory hole MH.

Structural bodies corresponding to the upper pillars UMP are similarly formed above structural bodies corresponding to the lower pillars LMP formed by the steps described above. Note that the steps corresponding to the lower pillar LMP and the steps corresponding to the upper pillar UMP are different mainly in that the holes LAH and the holes UAH are arranged in a staggered manner in plan view.

Thereafter, as illustrated in FIG. 9, for example, the replacement hole STH penetrating the upper trench UMT and the insulator 81 in the hole LAH is formed. As illustrated in FIG. 10, the replacement hole STH is formed so as to be in contact with each of the sacrificial members SM1 and SM2 corresponding to the upper pillar UMP and the sacrificial members SM1 and SM2 corresponding to the lower pillar LMP.

Then, although not illustrated, a process of replacing the stacked interconnects is performed. Briefly, first, the sacrificial members SM1 and SM2 are selectively removed through the replacement hole STH. Then, the spaces, from which the sacrificial members SM1 and SM2 are removed, are filled with conductors through the replacement hole STH. For example, the sacrificial member SM1 is replaced with the conductive layer 23a, and the sacrificial member SM2 is replaced with the conductive layer 23b. Thereafter, the conductors formed in the replacement hole STH are removed and the replacement hole STH is filled with an insulator. As a result, a plurality of conductive layers corresponding to the word lines WLa and WLb, and the select gate lines SGSa, SGSb, SGDa, and SGDb, respectively, are formed.

The memory pillars MP in the semiconductor memory device 1 according to the embodiment may be formed as described above. Note that the method of manufacturing the memory pillar MP described above is merely an example. For example, in a case where the arrangement of the holes LAH and the holes UAH is opposite in plan view, the replacement hole STH is provided so as to penetrate the insulator in the hole UAH and the insulator in the lower trench LMT. Further, the manufacturing method may be appropriately changed depending on the structure of the memory pillar MP. In the semiconductor memory device 1 according to the embodiment, it suffices that at least the holes LAH and the holes UAH are arranged in a staggered manner in plan view.

<3> Advantageous Effects of Embodiment

According to the semiconductor memory device 1 of the embodiment described above, a chip area of the semiconductor memory device 1 can be reduced. Hereinafter, advantageous effects of the semiconductor memory device 1 according to the embodiment will be described in detail.

In a semiconductor memory device in which memory cells are three-dimensionally stacked, it is conceivable to operate the semiconductor memory device by dividing the memory pillar MP into two regions in order to improve the storage density. For example, the semiconductor memory device can cause one memory pillar MP to function as two NAND strings NSa and NSb by independently controlling stacked interconnects such as word lines WL, which are in contact with the memory pillar MP and are divided into two. In such a semiconductor memory device, memory trenches MT are formed in order to divide the stacked interconnects.

As a method of improving the storage density, it is also conceivable to connect a plurality of memory pillars in the Z direction. In this method, the number of stacked memory cells can be increased by the plurality of connected memory pillars. In addition, since the processing of the memory pillars is divided into a plurality of times, the difficulty of deep hole processing for forming the memory holes MH may also be reduced.

In addition, as a method of improving the storage density, it is conceivable to form two memory holes MH from one hole AH using a memory trench MT. In this method, memory pillars MP can be arranged more densely than a processing pitch by lithography and etching. Connecting the plurality of memory pillars in the Z direction and forming two memory holes MH from one hole AH may be combined. Hereinafter, an example of a case where these methods are combined will be briefly described.

Figure 11:
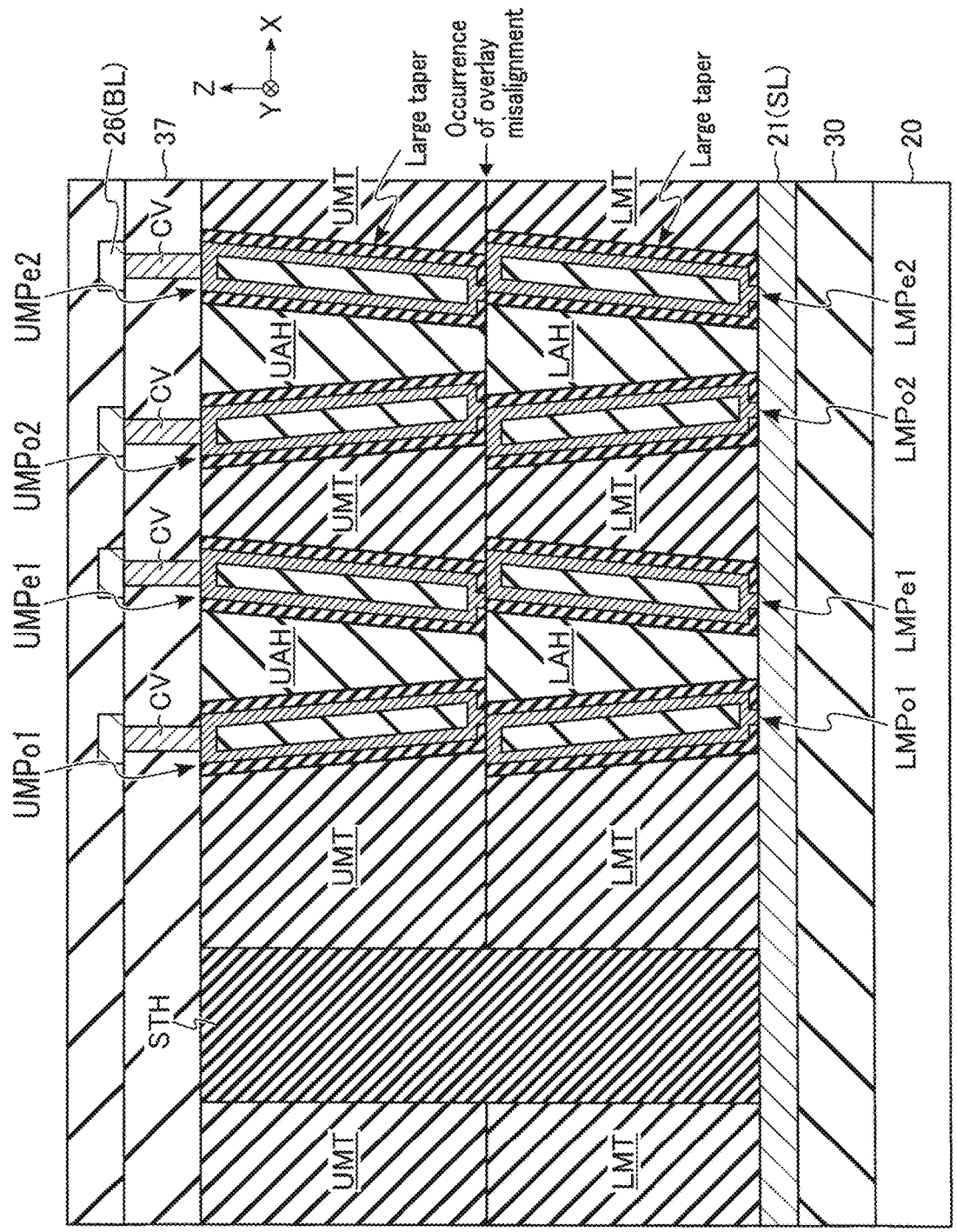
FIG. 11 is a cross-sectional view illustrating an example of a cross-sectional structure of a memory cell array in a semiconductor memory device according to a comparative example of the embodiment.
Figure 12:
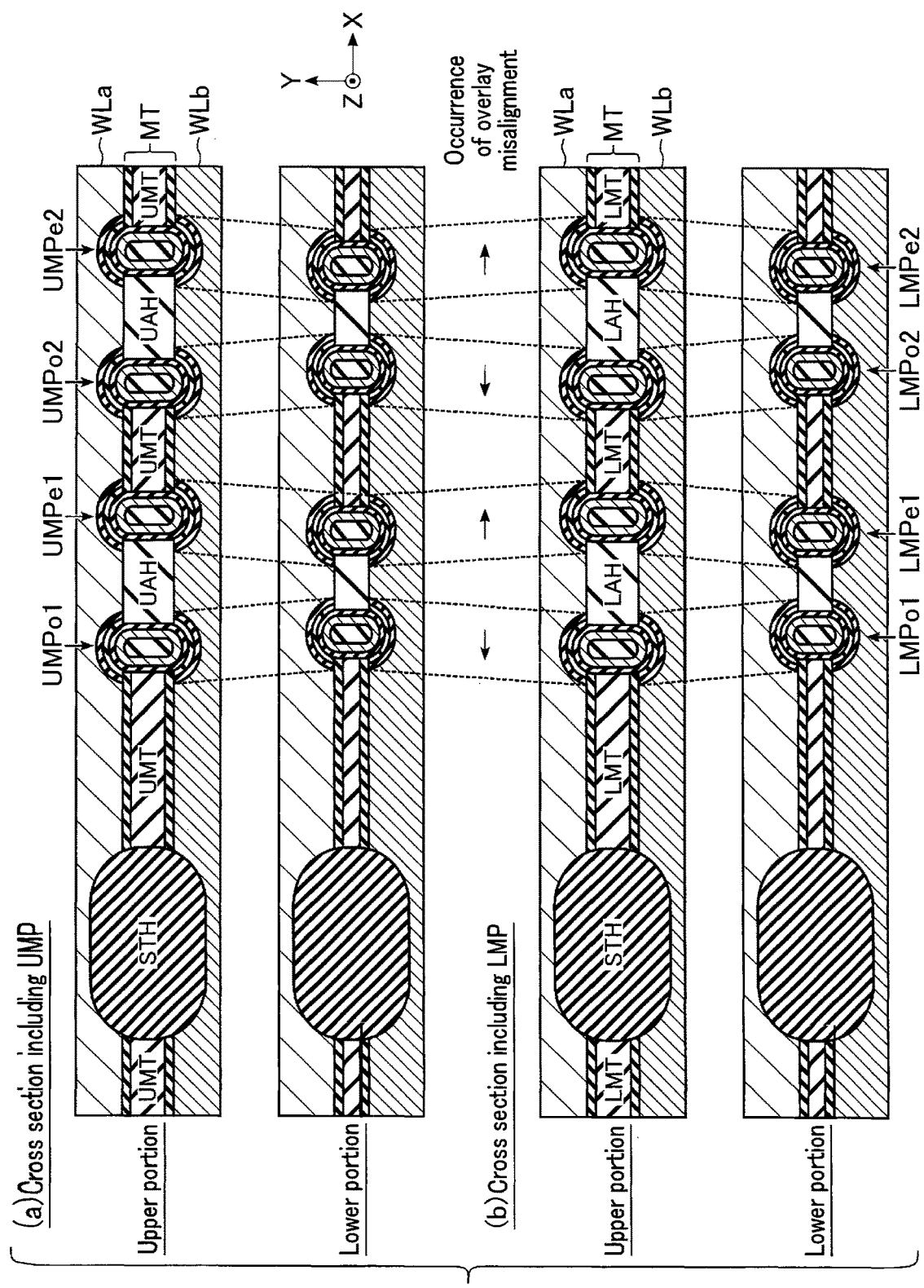
FIG. 12 is a cross-sectional view illustrating an example of a cross-sectional structure of the memory cell array in the semiconductor memory device according to the comparative example of the embodiment.

FIGS. 11 and 12 illustrate examples of cross-sectional structures of a memory cell array 10 in a semiconductor memory device according to a comparative example of the embodiment. FIG. 11 corresponds to a cross section perpendicular to a surface of a semiconductor substrate 20, and depicts a region similar to that in FIG. 6. FIG. 12 corresponds to a cross section parallel to the surface of the semiconductor substrate 20, and depicts a region similar to that in FIG. 7.

As illustrated in FIG. 11, the semiconductor memory device according to the comparative example of the embodiment has a structure in which holes LAH and holes UAH are arranged to overlap in a Z direction, and lower trenches LMT and upper trenches UMT are arranged to overlap in the Z direction. Lower pillars LMP and upper pillars UMP are provided along the holes LAH and UAH, respectively. In this example, the lower trenches LMT and the upper trenches UMT, and the holes LAH and UAH each have a large taper.

As illustrated in FIG. 12A, in a case where the upper trench UMT has a taper, the width of the upper trench UMT is smaller in a cross section including the lower portion of the upper pillar UMP than in a cross section including the upper portion of the upper pillar UMP. Further, arrangement of the upper pillars UMPo and UMPe may be changed depending on the position and the size of the holes UAH. As a result, the set of the upper pillars UMPo and UMPe is closer together as the hole UAH width is smaller, and is smaller as the upper trench UMT width is narrower.

In other words, the distance between two upper pillars UMP arranged on both sides of the hole UAH and the distance between two upper pillars UMP arranged between the adjacent holes UAH are changed depending on the change in shape of the holes UAH. For example, in the upper portion of the hole UAH, the distance between the two upper pillars UMP arranged on both sides of the hole UAH is large, and the distance between the two upper pillars UMP arranged between the adjacent holes UAH is small. On the other hand, in the lower portion of the hole UAH, the distance between the two upper pillars UMP arranged on both sides of the hole UAH is small, and the distance between the two upper pillars UMP arranged between the adjacent holes UAH is large.

Such a change in distance may similarly occur in the lower pillars LMPo and LMPe as illustrated in FIG. 12B. Therefore, in a case where the holes UAH and the holes LAH have tapers with similar tendencies, overlay misalignment may occur at joint portions between the upper pillars UMP and the lower pillars LMP. Usually, the overlay misalignment is suppressed by aligning the structural body in an upper layer with respect to the structural body in a lower layer.

However, in the case where two memory holes MH are formed from one hole AH, and the holes UAH and holes LAH overlap each other, unconformity occurs between the shift direction of the joint position in the lower portion of the upper pillar UMP and the shift direction of the joint position in the upper portion of the lower pillar LMP. Such overlay misalignment cannot be resolved by simple alignment. Therefore, in the semiconductor memory device according to the comparative example of the embodiment, it is necessary to relax each of the pitch of the lower pillars LMP in the X direction and the pitch of the upper pillars UMP in the X direction in order to couple channels of the lower pillars LMP and channels of the upper pillars UMP. As a result, in the semiconductor memory device according to the comparative example of the embodiment, the area of the memory cell array 10 increases, so that the chip area may increase.

On the other hand, the semiconductor memory device 1 according to the embodiment has a structure in which the holes LAH corresponding to the lower pillars LMP and the holes UAH corresponding to the upper pillars UMP are provided in a staggered manner in the extending direction of the memory trench MT in plan view (for example, in the X direction). Here, a case will be described where the semiconductor memory device 1 according to the embodiment includes memory pillars MP having a large taper as in the comparative example with reference to FIGS. 13 and 14.

Figure 13:
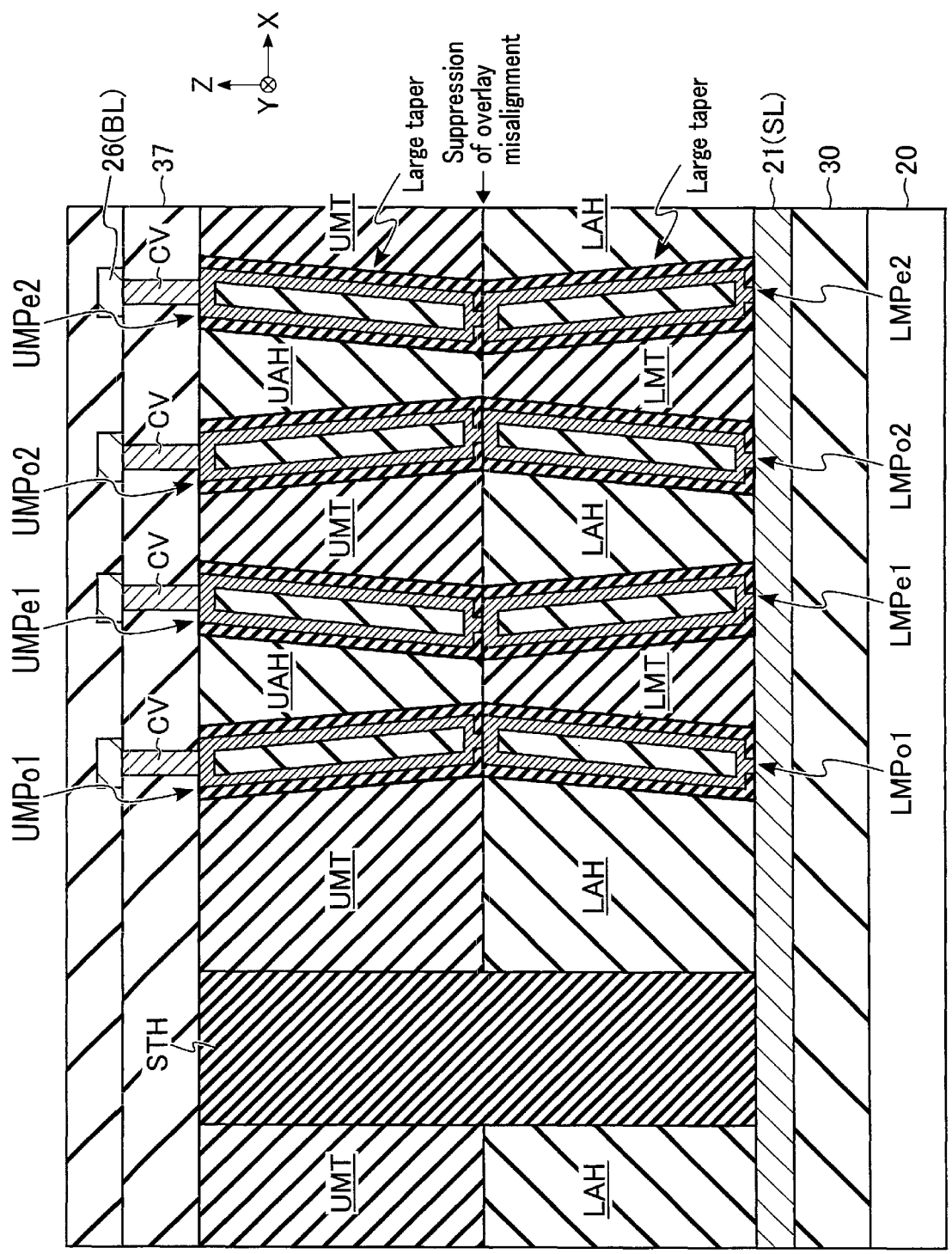
FIG. 13 is a cross-sectional view illustrating an example of a cross-sectional structure of the memory cell array in the semiconductor memory device according to the embodiment.
Figure 14:
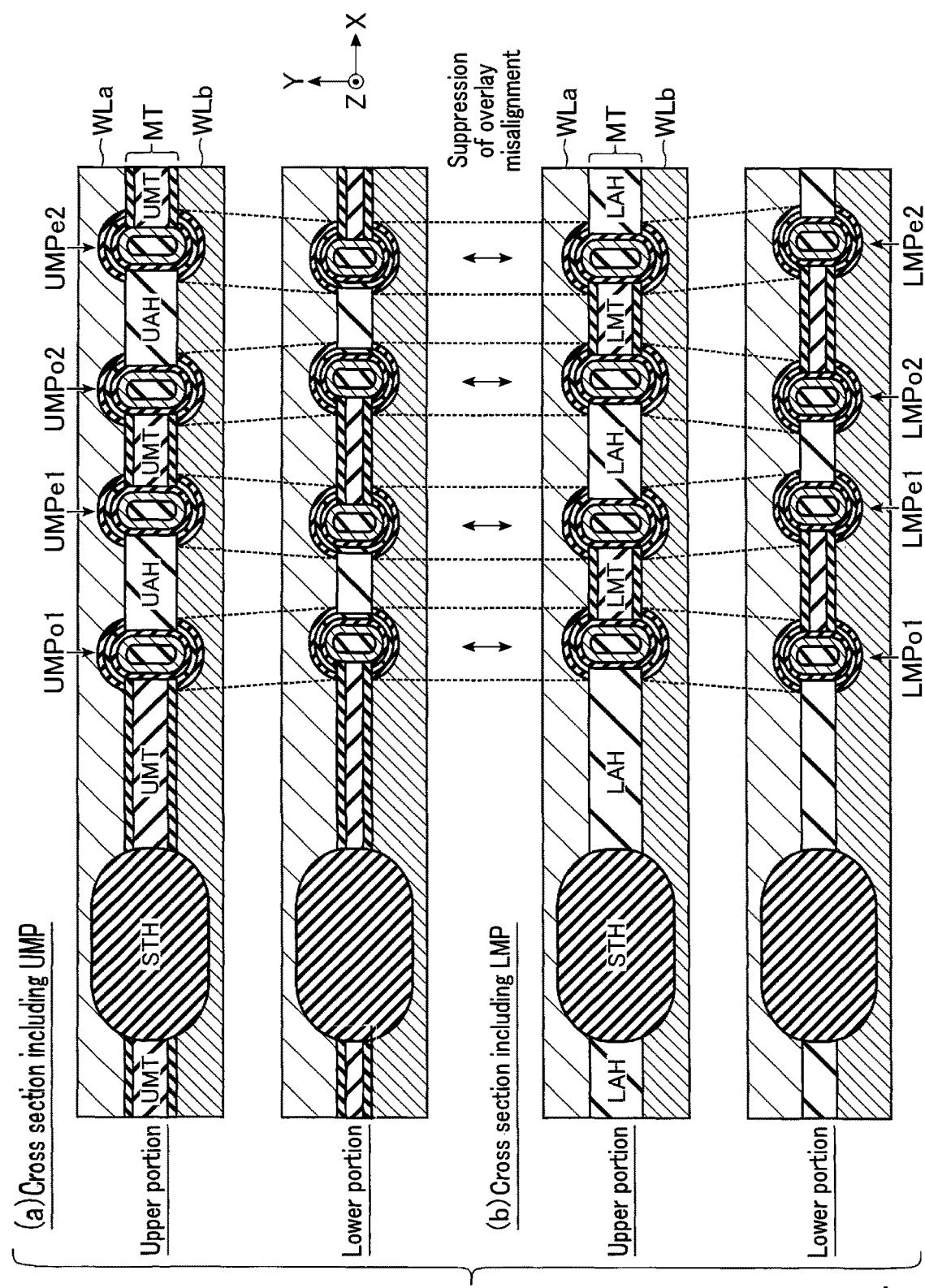
FIG. 14 is a cross-sectional view illustrating an example of a cross-sectional structure of the memory cell array in the semiconductor memory device according to the embodiment.

FIGS. 13 and 14 illustrate examples of cross-sectional structures of the memory cell array 10 in the semiconductor memory device 1 according to the embodiment. FIG. 13 corresponds to a cross section perpendicular to the surface of the semiconductor substrate 20, and depicts a region similar to that in FIG. 6. FIG. 14 corresponds to a cross section parallel to the surface of the semiconductor substrate 20, and depicts a region similar to that in FIG. 7.

As illustrated in FIG. 13, the semiconductor memory device 1 according to the embodiment has a structure in which the holes LAH and the upper trenches UMT are arranged to overlap in the Z direction, and the lower trenches LMT and the holes UAH are arranged to overlap in the Z direction. That is, the holes LAH and the holes UAH are arranged in a staggered manner in plan view. In other words, in the semiconductor memory device 1 according to the embodiment, the pitch of the holes LAH corresponding to the lower pillars LMP and the pitch of the holes UAH corresponding to the upper pillars UMP are shifted by 0.5 pitches. As a result, a direction in which the upper pillars UMPo are inclined and a direction in which the lower pillars LMPo are inclined are opposite, and a direction in which the upper pillars UMPe are inclined and a direction in which the lower pillars LMPe are inclined are opposite.

As a result, as illustrated in FIG. 14, the semiconductor memory device 1 according to the embodiment can suppress the overlay misalignment due to non-uniform pitch change in the upper pillars UMP and non-uniform pitch change in the lower pillars LMP. Further, in the semiconductor memory device 1 according to the embodiment, the lower trenches LMT and the upper trenches UMT, and the holes LAH and UAH can each be arranged without relaxing each of the pitch of the lower pillars LMP in the X direction and the pitch of the upper pillars UMP in the X direction.

As described above, in the semiconductor memory device 1 according to the embodiment, the margin of the overlay can be reduced compared to the comparative example, and the pitch of the memory pillars MP can be reduced compared to the comparative example. Therefore, in the semiconductor memory device 1 according to the embodiment, the circuit area of the memory cell array 10 can be reduced, and the chip area of the semiconductor memory device 1 can be reduced.

<4> Modifications of Embodiment

The configuration of the semiconductor memory device 1 according to the embodiment described above can be variously modified. Hereinafter, a first modification and a second modification of the embodiment will be described in order.

<4-1> First Modification

Figure 15:
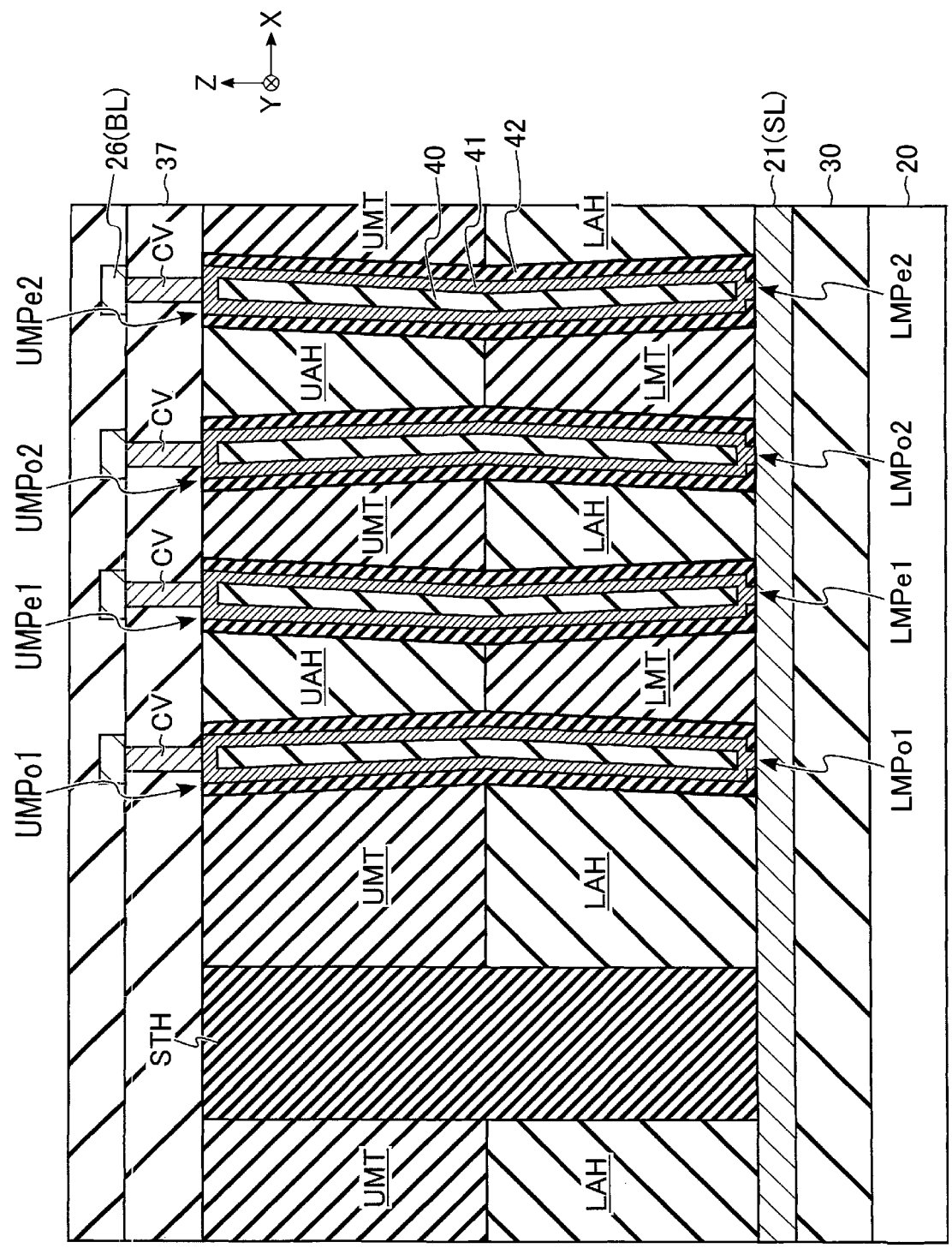
FIG. 15 is a cross-sectional view illustrating an example of a cross-sectional structure of a memory cell array in a semiconductor memory device according to a first modification of the embodiment.

FIG. 15 illustrates an example of a cross-sectional structure of a memory cell array 10 in a semiconductor memory device 1 according to a first modification of the embodiment, and depicts a region similar to that in FIG. 6. As illustrated in FIG. 15, the semiconductor memory device 1 according to the first modification of the embodiment is different from the semiconductor memory device 1 according to the embodiment in the structure of joint portions between lower pillars LMP and upper pillars UMP.

Specifically, in each memory pillar MP in the first modification of the embodiment, a core member 40, a semiconductor layer 41, and a stacked film 42 are each continuously provided between the lower pillar LMP and the upper pillar UMP. A contact CV is coupled to the upper surface of the semiconductor layer 41 in the upper pillar UMP. Other structures of the semiconductor memory device 1 according to the first modification of the embodiment are similar to those in the embodiment.

Here, an example of a method for forming such a structure will be briefly described. For example, first, the steps in FIGS. 8(1) to (5) corresponding to the lower pillars LMP are performed. That is, recesses RP1 corresponding to the lower pillars LMP are formed, so that the structure in which holes LAH are filled with insulators 81 is formed. Then, the steps in FIGS. 8(1) to (5) corresponding to the upper pillars UMP are performed. That is, recesses RP1 corresponding to the upper pillars UMP are formed, so that the structure in which holes UAH are filled with insulators 81 is formed. Thereafter, the steps in FIGS. 8(6) to (9) are performed with respect to each of the lower pillars LMP and the upper pillars UMP. As a result, a structure in which channels of the lower pillars LMP and channels of the upper pillars UMP are continuously provided may be formed.

As described above, the semiconductor memory device 1 according to the first modification of the embodiment has a structure in which the joint portions between the lower pillars LMP and the upper pillars UMP are different from those in the embodiment. Even in such a case, the semiconductor memory device 1 according to the first modification of the embodiment can acquire similar advantageous effects as those of the embodiment, and the chip area of the semiconductor memory device 1 can be reduced.

Note that, in the first modification of the embodiment, it suffices that at least one layer continuously formed between the lower pillar LMP and the upper pillar UMP is included. In order to improve the characteristics of NAND string NS, it is preferable that the channel (for example, the semiconductor layer 41) be continuously provided between the lower pillar LMP and the upper pillar UMP. In the semiconductor memory device according to the comparative example of the embodiment, the channel resistance of the NAND string NS can be reduced by providing the channel as an integral semiconductor layer, so that the power consumption of the semiconductor memory device 1 can be suppressed.

<4-2> Second Modification

Figure 16:
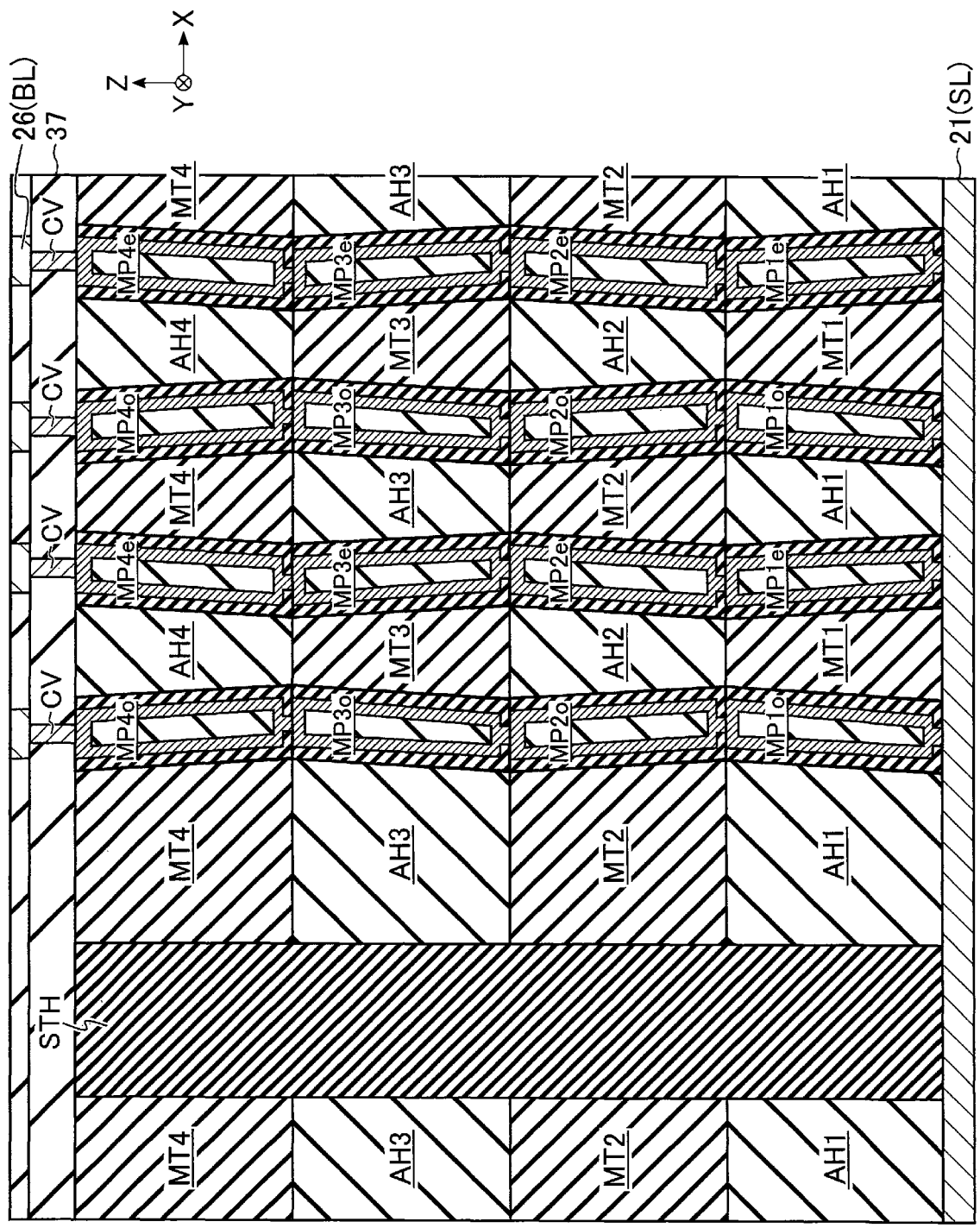
FIG. 16 is a cross-sectional view illustrating an example of a cross-sectional structure of a memory cell array in a semiconductor memory device according to a second modification of the embodiment.
Figure 17:
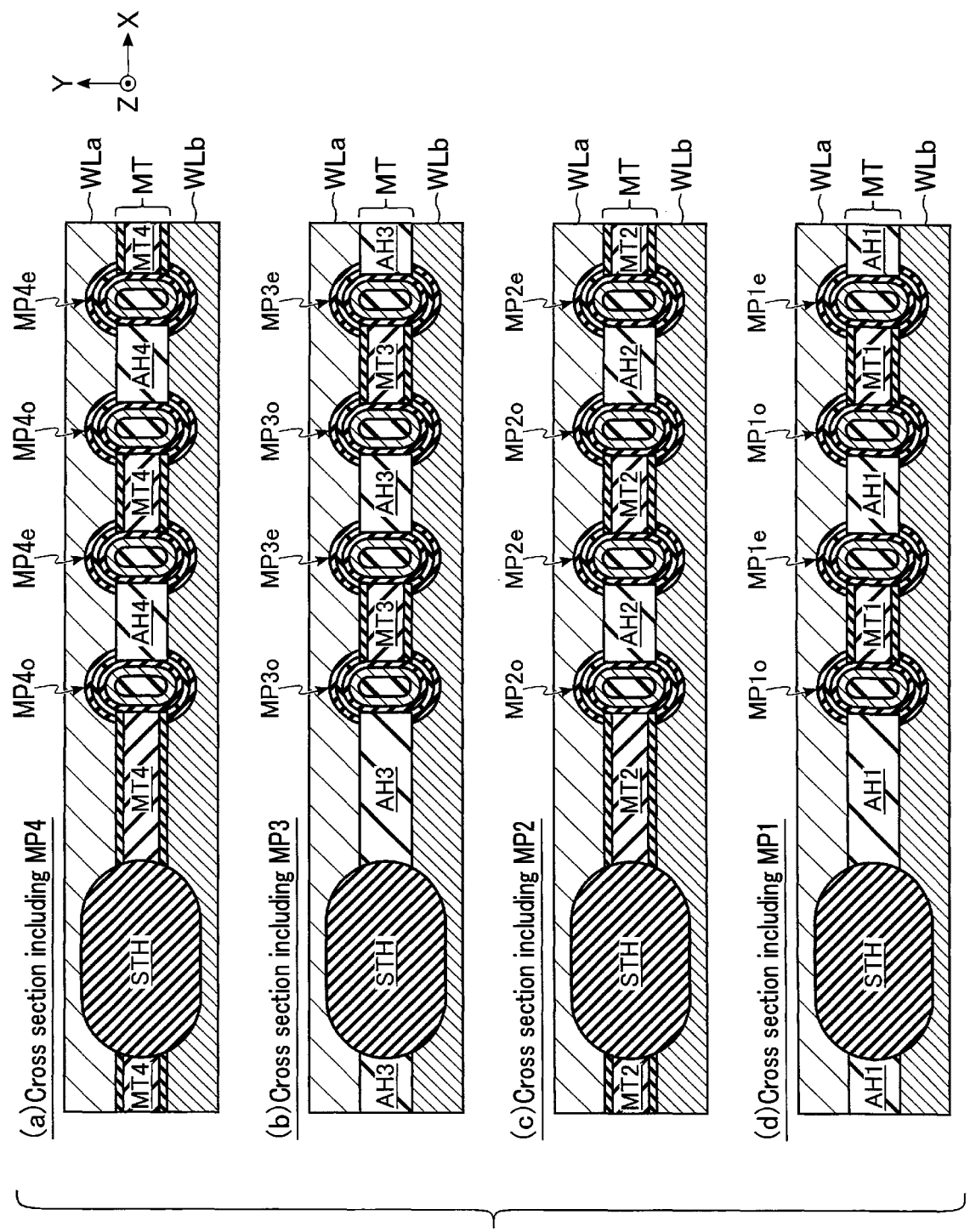
FIG. 17 is a cross-sectional view illustrating an example of a cross-sectional structure of the memory cell array in the semiconductor memory device according to the second modification of the embodiment.

FIGS. 16 and 17 illustrate examples of cross-sectional structures of a memory cell array 10 in a semiconductor memory device 1 according to a second modification of the embodiment. FIG. 16 corresponds to a cross section perpendicular to a surface of a semiconductor substrate 20, and depicts a region similar to that in FIG. 6. FIG. 17 corresponds to a cross section parallel to the surface of the semiconductor substrate 20, and depicts a region similar to that in FIG. 7. In the semiconductor memory device 1 according to the second modification of the embodiment, four memory pillars MP arranged in an X direction may be regarded as one set as in the embodiment.

As illustrated in FIG. 16, in the semiconductor memory device 1 according to the second modification of the embodiment, the memory pillar MP has a structure in which pillars MP1 to MP4 are connected in a Z direction. Hereinafter, among a plurality of pillars MP1 arranged in the X direction, odd-number-th arranged pillars MP1 from a replacement hole STH are referred to as "MP1o", and even-number-th arranged pillars MP1 from the replacement hole STH are referred to as "MP1e". Similarly, a plurality of pillars MP2 include odd-number-th arranged pillars MP2o, and even-number-th arranged pillars MP2e. A plurality of pillars MP3 include odd-number-th arranged pillars MP3o, and even-number-th arranged pillars MP3e. A plurality of pillars MP4 include odd-number-th arranged pillars MP4o, and even-number-th arranged pillars MP4e.

In addition, hereinafter, memory trenches MT and holes AH corresponding to the layer provided with the pillars MP1 are referred to as "MT1" and "AH1", respectively. Memory trenches MT and holes AH corresponding to the layer provided with the pillars MP2 are referred to as "MT2" and "AH2", respectively. Memory trenches MT and holes AH corresponding to the layer provided with the pillars MP3 are referred to as "MT3" and "AH3", respectively. Memory trenches MT and holes AH corresponding to the layer provided with the pillars MP4 are referred to as "MT4" and "AH4", respectively.

In the semiconductor memory device 1 according to the second modification of the embodiment, the holes AH2 are provided above the memory trenches MT1. The memory trenches MT3 are provided above the holes AH2. The holes AH4 are provided above the memory trenches MT3. That is, the memory trench MT1, the hole AH2, the memory trench MT3, and the hole AH4 are arranged in the Z direction.

On the other hand, the memory trenches MT2 are provided above the holes AH1. The holes AH3 are provided above the memory trenches MT2. The memory trenches MT4 are provided above the holes AH3. That is, the hole AH1, the memory trench MT2, the hole AH3, and the memory trench MT3 are arranged in the Z direction.

In addition, the pillars MP1o and MP1e are provided in a shape along the holes AH1. The pillars MP2o and MP2e are provided in a shape along the holes AH2. The pillars MP3o and MP3e are provided in a shape along the holes AH3. The pillars MP4o and MP4e are provided in a shape along the holes AH4. Channels (for example, semiconductor layers 41) of the pillars adjacent in the Z direction are electrically coupled to each other.

The replacement hole STH divides the holes AH1 and AH3 and the memory trenches MT2 and MT4. The replacement hole STH is filled with an insulator as in the embodiment. It suffices that the replacement hole STH divides either the hole AH or the memory trench MT in a layer provided with the memory pillars MP. Other structures of the semiconductor memory device 1 according to the second modification of the embodiment are similar to those in the embodiment.

As described above, the semiconductor memory device 1 according to the second modification of the embodiment has a structure in which the holes AH provided in layers adjacent in the Z direction are arranged in a staggered manner in the X direction in plan view. Even in such a case, the semiconductor memory device 1 according to the second modification of the embodiment can suppress overlay misalignment in pillars adjacent in the Z direction as in the embodiment, so that the chip area of the semiconductor memory device 1 can be reduced.

Note that, in order to acquire similar advantageous effects as those of the embodiment, it suffices that at least the holes AH provided in layers adjacent in the Z direction are arranged in a staggered manner. That is, the memory pillar MP may have a structure in which three or five or more pillars are connected in the Z direction.

<5> Others

In the embodiment, a case has been exemplified where the semiconductor layers 41 in the memory pillars MP are electrically coupled to the conductive layer 21 (source line SL) via the bottom surfaces of the memory pillars MP, but the present invention is not limited thereto. For example, in the semiconductor memory device 1, the semiconductor layers 41 in the memory pillars MP and the source line SL may be coupled via the side surfaces of the memory pillars MP. A configuration for relaying the upper pillars UMP, the lower pillars LMP, and the joint portions may be provided between the upper pillars UMP and the lower pillars LMP.

In the semiconductor memory device 1 according to the embodiment, for example, the distance between the lower pillars LMPe1 and LMPo2 in the X direction in the cross section including the conductive layer 23a and the conductive layer 23b on a lower side is smaller than the distance between the lower pillars LMPe1 and LMPo2 in the X direction in the cross section including the conductive layer 23a and the conductive layer 23b on an upper side. In addition, the distance between the upper pillars UMPe1 and UMPo2 in the X direction in the cross section including the conductive layer 24a and the conductive layer 24b on the lower side is greater than the distance between the upper pillars UMPe1 and UMPo2 in the X direction in the cross section including the conductive layer 24a and the conductive layer 24b on the upper side.

The distance between the lower pillars LMPe1 and LMPo1 in the X direction in the cross section including the conductive layer 23a and the conductive layer 23b on the lower side is greater than the distance between the lower pillars LMPe1 and LMPo1 in the X direction in the cross section including the conductive layer 23a and the conductive layer 23b on the upper side. In addition, the distance between the upper pillars UMPe1 and UMPo1 in the X direction in the cross section including the conductive layer 24a and the conductive layer 24b on the lower side is smaller than the distance between the upper pillars UMPe1 and UMPo1 in the X direction in the cross section including the conductive layer 24a and the conductive layer 24b on the upper side.

The distance between the lower pillars LMPo2 and LMPe2 in the X direction in the cross section including the conductive layer 23a and the conductive layer 23b on the lower side is greater than the distance between the lower pillars LMPo2 and LMPe2 in the X direction in the cross section including the conductive layer 23a and the conductive layer 23b on the upper side. In addition, the distance between the upper pillars UMPo2 and UMPe2 in the X direction in the cross section including the conductive layer 24a and the conductive layer 24b on the lower side is smaller than the distance between the upper pillars UMPe1 and UMPo1 in the X direction in the cross section including the conductive layer 24a and the conductive layer 24b on the upper side.

In the embodiment, a case has been exemplified where the charge storage layers of the memory cell transistors MC are insulating films, but conductors such as semiconductors or metals may be used as the charge storage layers. That is, the semiconductor memory device 1 may include a floating gate type memory cell transistors MC in which the insulating films 44 and 54 are replaced with conductors. The configuration of the memory cell transistor MC is designed according to the structure of the charge storage layers in the memory pillar MP.

For example, in a case where the charge storage layers in each memory pillar MP are separated for each memory cell transistor MC in both the Y direction and the Z direction, both the insulating film and the conductor can be used as the charge storage layer. The conductor used as the charge storage layer may have a stacked structure using two or more types from among a semiconductor, metal, and an insulator. On the other hand, in a case where the charge storage layers in each memory pillar MP are not separated for each memory cell transistor MC in both the Y direction and the Z direction, the insulating film is used as the charge storage layer.

Note that the tunnel insulating films and the block insulating films corresponding to the same memory group MG may each be shared by or separated for the transistors in the NAND strings NSa and NSb, regardless of whether or not the charge storage layers are separated in the Y direction and the Z direction for each memory cell transistor MC. In addition, in a case where the tunnel insulating film and the block insulating film corresponding to the same memory group MG each extend in the Z direction in the memory pillar MP, these insulating films may be separated for each memory cell transistor MC.

Note that the memory pillar MP may have a structure in which a pillar corresponding to the select gate line SGD and a pillar corresponding to the word line WL are connected to each other. In this case, the holes AH corresponding to the pillars corresponding to the select gate line SGD and the holes AH corresponding to the pillars coupled to the pillars in the Z direction are provided in a staggered manner in plan view. The arrangement of the memory pillars MP is not limited to a four-row staggered arrangement, and may be any arrangement. The number of bit lines BL overlapping each memory pillar MP may be designed to be any number.

In the embodiment, the memory cell array 10 may include one or more dummy word lines between the word line WL0 and the select gate line SGS, and between the word line WL7 and the select gate line SGD. In a case where the dummy word lines are provided, dummy transistors are provided corresponding to the number of dummy word lines between the memory cell transistor MC0 and the select transistor ST2, and between the memory cell transistor MC7 and the select transistor ST1. The dummy transistors are transistors having a structure similar to that of the memory cell transistor MC, and being not used for storing data. In a case where two or more memory pillars MP are connected in the Z direction, the memory cell transistors MC close to the connecting portion of the pillars may be used as the dummy transistors.

In the above embodiment, a case has been described as an example in which the semiconductor memory device 1 has a structure in which circuits such as the sense amplifier module 16 are provided under the memory cell array 10, but the present invention is not limited thereto. For example, the semiconductor memory device 1 may have a structure in which a chip provided with the sense amplifier module 16 and the like and a chip provided with the memory cell array 10 are bonded.

In this specification, the "coupling" indicates electrical coupling, and does not exclude an intervention of another element. The "electrically coupled" may be made via an insulator as long as one can operate in the same manner as the one electrically coupled. The "columnar" indicates the structural body provided in the hole formed in the manufacturing steps of the semiconductor memory device 1. A "cross section including two conductive layers provided in the same layer" corresponds to, for example, the cross section parallel to the surface of the semiconductor substrate 20 and including the two conductive layers. The "in plan view" corresponds to, for example, viewing an object in a direction perpendicular to the surface of the semiconductor substrate 20.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

The invention claimed is:

1. A semiconductor memory device comprising:
a first conductive layer;
a second conductive layer, a third conductive layer, a fourth conductive layer, and a fifth conductive layer stacked above the first conductive layer to be separated from each other in a first direction;
a sixth conductive layer, a seventh conductive layer, an eighth conductive layer, and a ninth conductive layer stacked above the first conductive layer, and respectively provided in same layers as the second conductive layer, the third conductive layer, the fourth conductive layer, and the fifth conductive layer, to be separated from the second conductive layer, the third conductive layer, the fourth conductive layer, and the fifth conductive layer in a second direction intersecting the first direction;
a first insulating member provided along the first direction, and comprises a portion provided between the second conductive layer and the sixth conductive layer and a portion provided between the third conductive layer and the seventh conductive layer;
a second insulating member provided along the first direction above the first insulating member, and comprises a portion provided between the fourth conductive layer and the eighth conductive layer and a portion provided between the fifth conductive layer and the ninth conductive layer;
a first pillar and a second pillar in contact with the second conductive layer, the third conductive layer, the sixth conductive layer, and the seventh conductive layer, the first pillar and the second pillar being provided to sandwich the first insulating member in a third direction intersecting both the first direction and the second direction;
a third pillar and a fourth pillar in contact with the fourth conductive layer, the fifth conductive layer, the eighth conductive layer, and the ninth conductive layer, the third pillar and the fourth pillar being provided to sandwich the second insulating member in the third direction,
a third insulating member provided along the first direction, the third insulating member comprising a portion provided between the second conductive layer and the sixth conductive layer and a portion provided between the third conductive layer and the seventh conductive layer, and being adjacent to the first insulating member with the first pillar interposed between the third insulating member and the first insulating member in the third direction;
a fourth insulating member provided above the third insulating member along the first direction, the fourth insulating member comprising a portion provided between the fourth conductive layer and the eighth conductive layer and a portion provided between the fifth conductive layer and the ninth conductive layer, and being adjacent to the second insulating member with the third pillar interposed between the fourth insulating member and the second insulating member in the third direction;
a fifth pillar in contact with the second conductive layer, the third conductive layer, the sixth conductive layer, and the seventh conductive layer, and adjacent to the first pillar with the third insulating member interposed between the fifth pillar and the first pillar in the third direction; and
a sixth pillar in contact with the fourth conductive layer, the fifth conductive layer, the eighth conductive layer, and the ninth conductive layer, and adjacent to the third pillar with the fourth insulating member interposed between the sixth pillar and the third pillar in the third direction, wherein
the first pillar is provided along the first insulating member, and comprises a first semiconductor layer coupled to the first conductive layer,
the second pillar is provided along the first insulating member, and comprises a second semiconductor layer coupled to the first conductive layer,
the third pillar is provided along the second insulating member, and comprises a third semiconductor layer coupled to the first semiconductor layer,
the fourth pillar is provided along the second insulating member, and comprises a fourth semiconductor layer coupled to the second semiconductor layer, the fifth pillar is provided along the third insulating member, and comprises a fifth semiconductor layer coupled to the first conductive layer, the sixth pillar is provided along the fourth insulating member, and comprises a sixth semiconductor layer coupled to the fifth semiconductor layer, a distance between the first pillar and the second pillar in the third direction in a cross section including the second conductive layer and the sixth conductive layer is smaller than a distance between the first pillar and the second pillar in the third direction in a cross section including the third conductive layer and the seventh conductive layer, a distance between the third pillar and the fourth pillar in the third direction in a cross section including the fourth conductive layer and the eighth conductive layer is greater than a distance between the third pillar and the fourth pillar in the third direction in a cross section including the fifth conductive layer and the ninth conductive layer, a distance between the first pillar and the fifth pillar in the third direction in the cross section including the second conductive layer and the sixth conductive layer is greater than a distance between the first pillar and the fifth pillar in the third direction in the cross section including the third conductive layer and the seventh conductive layer, a distance between the third pillar and the sixth pillar in the third direction in the cross section including the fourth conductive layer and the eighth conductive layer is smaller than a distance between the third pillar and the sixth pillar in the third direction in the cross section including the fifth conductive layer and the ninth conductive layer, and a structure similar to a structure including the first to fourth insulating members and the first to fourth pillars is repeatedly arranged in the third direction.

2. The semiconductor memory device according to claim 1, further comprising:

a fifth insulating member that is provided along the first direction, the fifth insulating member comprising a portion provided between the second conductive layer and the sixth conductive layer and a portion provided between the third conductive layer and the seventh conductive layer, and being adjacent to the first insulating member with the second pillar interposed between the fifth insulating member and the first insulating member in the third direction;

a sixth insulating member provided above the fifth insulating member along the first direction, the sixth insulating member comprising a portion provided between the fourth conductive layer and the eighth conductive layer and a portion provided between the fifth conductive layer and the ninth conductive layer, and being adjacent to the second insulating member with the fourth pillar interposed between the sixth insulating member and the second insulating member in the third direction;

a seventh pillar in contact with the second conductive layer, the third conductive layer, the sixth conductive layer, and the seventh conductive layer, and adjacent to the second pillar with the fifth insulating member interposed between the seventh pillar and the second pillar in the third direction; and an eighth pillar in contact with the fourth conductive layer, the fifth conductive layer, the eighth conductive layer, and the ninth conductive layer, and adjacent to the fourth pillar with the sixth insulating member interposed between the eighth pillar and the fourth pillar in the third direction, wherein the seventh pillar is provided along the fifth insulating member, and comprises a seventh semiconductor layer coupled to the first conductive layer, the eighth pillar is provided along the sixth insulating member, and comprises an eighth semiconductor layer coupled to the seventh semiconductor layer, a distance between the second pillar and the seventh pillar in the third direction in the cross section including the second conductive layer and the sixth conductive layer is greater than a distance between the second pillar and the seventh pillar in the third direction in the cross section including the third conductive layer and the seventh conductive layer, and a distance between the fourth pillar and the eighth pillar in the third direction in the cross section including the fourth conductive layer and the eighth conductive layer is smaller than a distance between the fourth pillar and the eighth pillar in the third direction in the cross section including the fifth conductive layer and the ninth conductive layer.

3. The semiconductor memory device according to claim 1, wherein the first insulating member comprises a first insulator in contact with each of the first pillar and the second pillar, the second conductive layer, the third conductive layer, the sixth conductive layer, and the seventh conductive layer, the second insulating member comprises a second insulator in contact with the third pillar and the fourth pillar, and a third insulator that is different from the second insulator and insulates the first insulator from each of the fourth conductive layer, the fifth conductive layer, the eighth conductive layer, and the ninth conductive layer, the third insulating member comprises a fourth insulator in contact with the first pillar and the fifth pillar, and a fifth insulator that is different from the fourth insulator and insulates the fourth insulator from each of the second conductive layer, the third conductive layer, the sixth conductive layer, and the seventh conductive layer, and the fourth insulating member comprises a sixth insulator in contact with the third pillar and the sixth pillar, the fourth conductive layer, the fifth conductive layer, the eighth conductive layer, and the ninth conductive layer.

4. The semiconductor memory device according to claim 1, further comprising a seventh insulating member provided to extend in the first direction, the seventh insulating member dividing a region between a set of the second conductive layer, the third conductive layer, the fourth conductive layer, and the fifth conductive layer, and a set of the sixth conductive layer, the seventh conductive layer, the eighth conductive layer, and the ninth conductive layer.

5. The semiconductor memory device according to claim 1, wherein the first pillar further comprises a first insulating film is provided between the first semiconductor layer and each of the second conductive layer, the third conductive layer, the sixth conductive layer, and the seventh conductive layer, the second pillar further comprises a second insulating film provided between the second semiconductor layer and each of the second conductive layer, the third conductive layer, the sixth conductive layer, and the seventh conductive layer, the third pillar further comprises a third insulating film provided between the third semiconductor layer and each of the fourth conductive layer, the fifth conductive layer, the eighth conductive layer, and the ninth conductive layer, the fourth pillar further comprises a fourth insulating film provided between the fourth semiconductor layer and each of the fourth conductive layer, the fifth conductive layer, the eighth conductive layer, and the ninth conductive layer, a portion where the first pillar intersects the second conductive layer functions as a first memory cell, a portion where the first pillar intersects the third conductive layer functions as a second memory cell, a portion where the first pillar intersects the sixth conductive layer functions as a third memory cell, a portion where the first pillar intersects the seventh conductive layer functions as a fourth memory cell, a portion where the second pillar intersects the second conductive layer functions as a fifth memory cell, a portion where the second pillar intersects the third conductive layer functions as a sixth memory cell, a portion where the second pillar intersects the sixth conductive layer functions as a seventh memory cell, a portion where the second pillar intersects the seventh conductive layer functions as an eighth memory cell, a portion where the third pillar intersects the fourth conductive layer functions as a ninth memory cell, a portion where the third pillar intersects the fifth conductive layer functions as a tenth memory cell, a portion where the third pillar intersects the eighth conductive layer functions as an eleventh memory cell, a portion where the third pillar intersects the ninth conductive layer functions as a twelfth memory cell, a portion where the fourth pillar intersects the fourth conductive layer functions as a thirteenth memory cell, a portion where the fourth pillar intersects the fifth conductive layer functions as a fourteenth memory cell, a portion where the fourth pillar intersects the eighth conductive layer functions as a fifteenth memory cell, and a portion where the fourth pillar intersects the ninth conductive layer functions as a sixteenth memory cell.

6. The semiconductor memory device according to claim 1, further comprising:
a first bit line coupled to the third semiconductor layer in the third pillar; and
a second bit line coupled to the fourth semiconductor layer in the fourth pillar, wherein
the first conductive layer is used as a source line, and
the second to ninth conductive layers are each used as a word line.

7. The semiconductor memory device according to claim 1, further comprising:
a boundary that exists between the first semiconductor layer and the third semiconductor layer; and
a boundary that exists between the second semiconductor layer and the fourth semiconductor layer.

8. The semiconductor memory device according to claim 1, further comprising:
the first semiconductor layer and the third semiconductor layer that are continuously provided, and
the second semiconductor layer and the fourth semiconductor layer that are continuously provided.

9. The semiconductor memory device according to claim 1, further comprising:
a tenth conductive layer and an eleventh conductive layer stacked above the fifth conductive layer to be separated from each other in the first direction;
a twelfth conductive layer and a thirteenth conductive layer provided above the ninth conductive layer, and are respectively provided in same layers as the tenth conductive layer and the eleventh conductive layer;
an eighth insulating member provided along the first direction, and comprises a portion provided between the tenth conductive layer and the twelfth conductive layer, and a portion provided between the eleventh conductive layer and the thirteenth conductive layer; and
a ninth pillar and a tenth pillar in contact with the tenth conductive layer, the eleventh conductive layer, the twelfth conductive layer, and the thirteenth conductive layer, the ninth pillar and the tenth pillar being provided to sandwich the eighth insulating member in the third direction, wherein
the ninth pillar is provided along the eighth insulating member, and comprises a ninth semiconductor layer coupled to the third semiconductor layer,
the tenth pillar is provided along the eighth insulating member, and comprises a tenth semiconductor layer coupled to the fourth semiconductor layer, and
a distance between the ninth pillar and the tenth pillar in the third direction in a cross section including the tenth conductive layer and the twelfth conductive layer is smaller than a distance between the ninth pillar and the tenth pillar in the third direction in a cross section including the eleventh conductive layer and the thirteenth conductive layer.

* * * * *